US012182635B2

(12) United States Patent
Estep et al.

(10) Patent No.: US 12,182,635 B2
(45) Date of Patent: Dec. 31, 2024

(54) CHAINED RESOURCE LOCKING

(71) Applicant: Micron Technology, Inc., Boise, ID (US)

(72) Inventors: Patrick Estep, Rowlett, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 251 days.

(21) Appl. No.: 17/405,457

(22) Filed: Aug. 18, 2021

(65) Prior Publication Data

US 2023/0056500 A1    Feb. 23, 2023

(51) Int. Cl.
*G06F 9/52*    (2006.01)
*G06F 9/50*    (2006.01)

(52) U.S. Cl.
CPC ............ *G06F 9/526* (2013.01); *G06F 9/5005* (2013.01)

(58) Field of Classification Search
CPC .. G06F 9/526; G06F 9/5005; G06F 2209/548; G06F 9/542; G06F 2209/521
See application file for complete search history.

(56) References Cited

U.S. PATENT DOCUMENTS

| | | | |
|---|---|---|---|
| 6,247,025 B1 * | 6/2001 | Bacon ................. | G06F 16/2343 707/999.102 |
| 6,449,614 B1 * | 9/2002 | Marcotte ................. | G06F 9/526 |
| 7,886,300 B1 * | 2/2011 | Long ..................... | G06F 9/5016 710/200 |
| 8,122,229 B2 | 2/2012 | Wallach et al. | |
| 8,156,307 B2 | 4/2012 | Wallach et al. | |
| 8,205,066 B2 | 6/2012 | Brewer et al. | |
| 8,423,745 B1 | 4/2013 | Brewer | |
| 8,561,037 B2 | 10/2013 | Brewer et al. | |
| 8,578,380 B1 * | 11/2013 | Adams ................... | G06F 9/526 718/100 |
| 8,880,853 B2 * | 11/2014 | Arimilli ................. | G06F 9/524 712/220 |
| 9,710,384 B2 | 7/2017 | Wallach et al. | |
| 9,892,481 B2 * | 2/2018 | Ginzburg ................. | G06T 1/60 |

(Continued)

FOREIGN PATENT DOCUMENTS

KR    20150040328    4/2015
WO    2010051167    5/2010
(Continued)

OTHER PUBLICATIONS

"International Application Serial No. PCT US2022 074194, International Search Report mailed Nov. 7, 2022", 3 pages.

(Continued)

*Primary Examiner* — Faisal M Zaman
(74) *Attorney, Agent, or Firm* — Schwegman Lundberg & Woessner, P.A.

(57) ABSTRACT

Devices and techniques for CHAINED RESOURCE LOCKING are described herein. Threads form a last-in-first-out (LIFO) queue on a resource lock to create a chained lock on the resource. A data store representing the lock for the resource holds the previous thread's identifier, enabling a subsequent thread to wake the previous thread using the identifier when the subsequent thread releases the lock. Generally, the thread releasing the lock need not interact with the data store, reducing contention for the data store among many threads.

29 Claims, 13 Drawing Sheets

(56) References Cited

U.S. PATENT DOCUMENTS

| | | | |
|---|---|---|---|
| 10,990,391 B2 | 4/2021 | Brewer | |
| 10,990,392 B2 | 4/2021 | Brewer | |
| 2001/0014905 A1* | 8/2001 | Onodera | G06F 9/52 |
| | | | 719/312 |
| 2006/0218556 A1* | 9/2006 | Nemirovsky | G06F 9/3891 |
| | | | 712/E9.071 |
| 2007/0136725 A1* | 6/2007 | Accapadi | G06F 9/526 |
| | | | 718/100 |
| 2008/0270708 A1 | 10/2008 | Warner et al. | |
| 2009/0037927 A1* | 2/2009 | Sangili | G06F 9/485 |
| | | | 718/108 |
| 2009/0199189 A1* | 8/2009 | Arimilli | G06F 9/52 |
| | | | 718/102 |
| 2009/0271789 A1 | 10/2009 | Babich | |
| 2011/0047549 A1* | 2/2011 | Rogers | G06F 9/50 |
| | | | 718/100 |
| 2011/0239219 A1* | 9/2011 | Fulton | G06F 9/526 |
| | | | 711/147 |
| 2012/0079177 A1 | 3/2012 | Brewer et al. | |
| 2012/0079495 A1* | 3/2012 | Conti | G06F 9/526 |
| | | | 718/104 |
| 2012/0159487 A1* | 6/2012 | Bates | G06F 9/526 |
| | | | 718/100 |
| 2013/0262807 A1* | 10/2013 | Ju | G06F 12/121 |
| | | | 711/E12.001 |
| 2013/0332711 A1 | 12/2013 | Leidel et al. | |
| 2015/0106542 A1* | 4/2015 | Horikawa | G06F 9/526 |
| | | | 710/200 |
| 2015/0143350 A1 | 5/2015 | Brewer | |
| 2015/0206561 A1 | 7/2015 | Brewer et al. | |
| 2015/0286586 A1* | 10/2015 | Yadav | G06F 9/526 |
| | | | 711/152 |
| 2017/0039094 A1* | 2/2017 | Dice | G06F 9/526 |
| 2018/0293095 A1* | 10/2018 | Ishida | G06F 13/24 |
| 2019/0042214 A1 | 2/2019 | Brewer | |
| 2019/0171604 A1 | 6/2019 | Brewer | |
| 2019/0243700 A1 | 8/2019 | Brewer | |
| 2019/0303154 A1 | 10/2019 | Brewer | |
| 2019/0317832 A1* | 10/2019 | Jayasena | G06F 9/48 |
| 2019/0324928 A1 | 10/2019 | Brewer | |
| 2019/0340019 A1 | 11/2019 | Brewer | |
| 2019/0340020 A1 | 11/2019 | Brewer | |
| 2019/0340021 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0226001 A1* | 7/2020 | Ma | G06F 9/5022 |
| 2021/0055964 A1 | 2/2021 | Brewer | |
| 2021/0064374 A1 | 3/2021 | Brewer | |
| 2021/0064422 A1* | 3/2021 | Tsirkin | G06F 9/526 |
| 2021/0064435 A1 | 3/2021 | Brewer | |
| 2021/0149600 A1 | 5/2021 | Brewer | |
| 2021/0181991 A1 | 6/2021 | Brewer | |
| 2022/0138022 A1* | 5/2022 | Dice | G06F 9/5016 |
| | | | 718/102 |
| 2022/0350602 A1* | 11/2022 | Yang | G06F 9/526 |

FOREIGN PATENT DOCUMENTS

| | | |
|---|---|---|
| WO | 2013184380 | 12/2013 |
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |
| WO | 2023023441 | 2/2023 |

OTHER PUBLICATIONS

"International Application Serial No. PCT US2022 074194, Written Opinion mailed Nov. 7, 2022", 3 pages.

* cited by examiner

CHAINED RESOURCE LOCKING

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
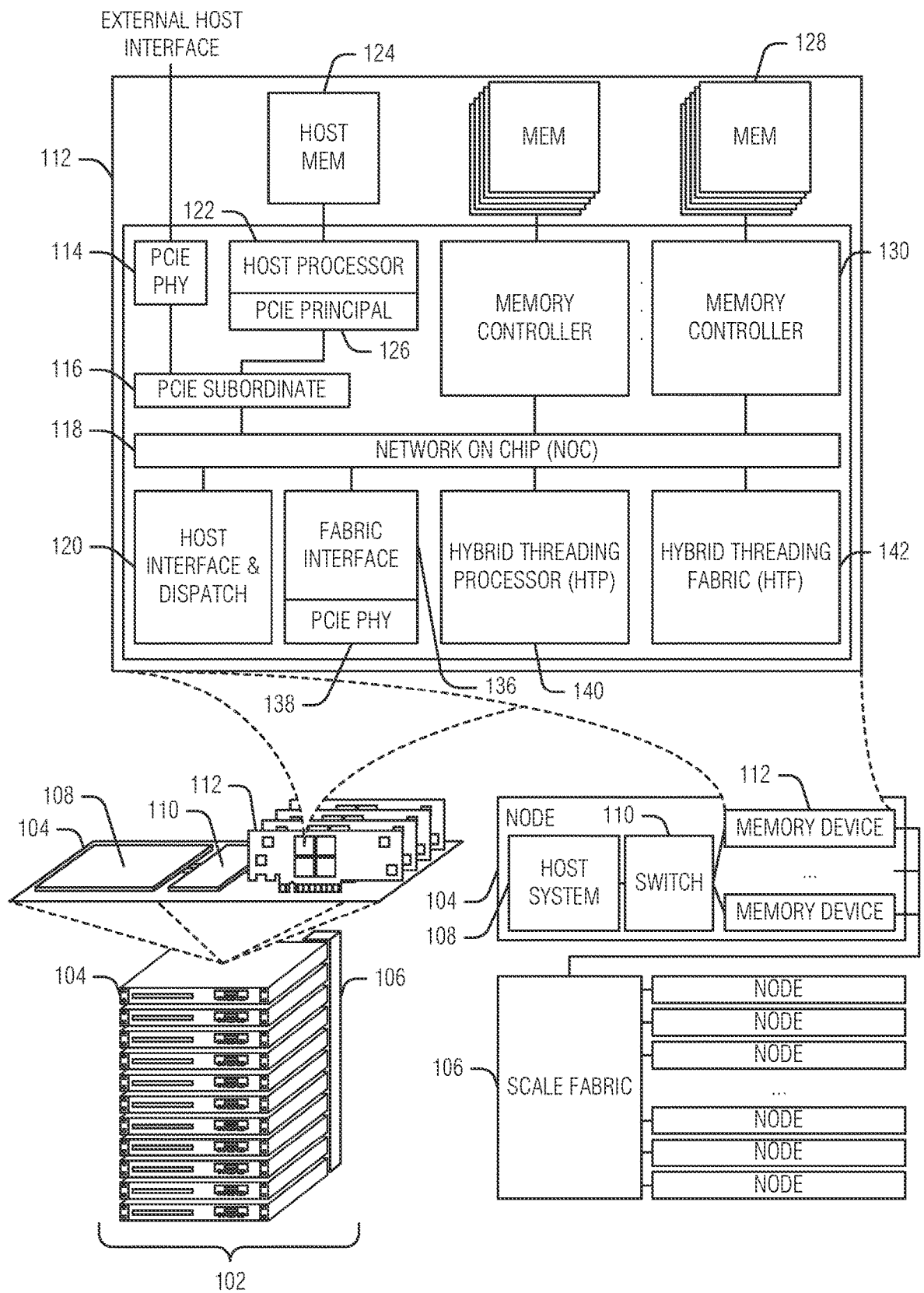
FIG. 1 illustrates generally a first example of a first memory-compute device in the context of a memory-compute system, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a compute-near-memory system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a compute-near-memory system can be particularly suited for implementing a hierarchy of instructions and nested loops (e.g., two, three, or more, loops deep, or multiple-dimensional loops). A standard compiler can be used to accept high-level language instructions and, in turn, compile directly into the dataflow architecture of one or more of the nodes. For example, a node in the system can include a hybrid threading fabric accelerator. The hybrid threading fabric accelerator can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

Figure 9A:
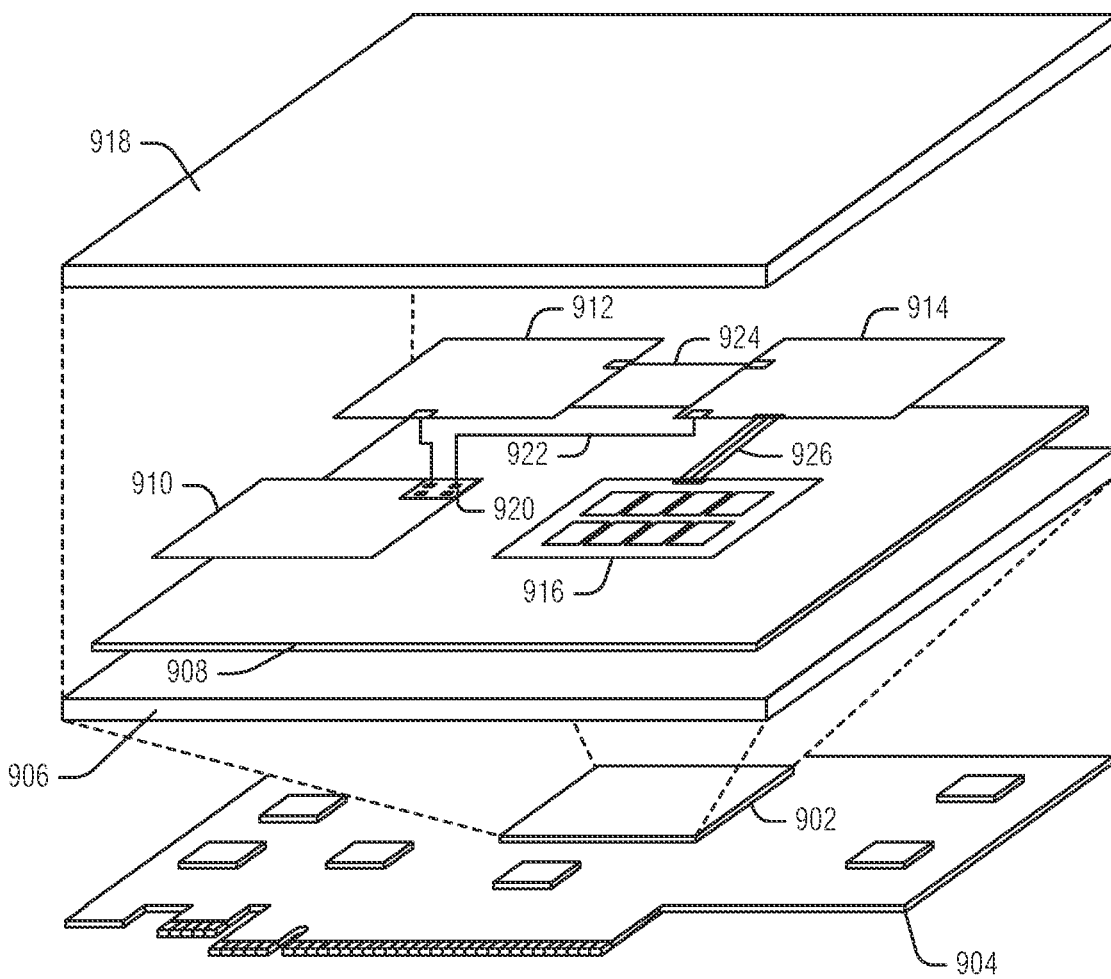
FIG. 9A illustrates generally an example of a chiplet system, according to an embodiment.
Figure 9B:
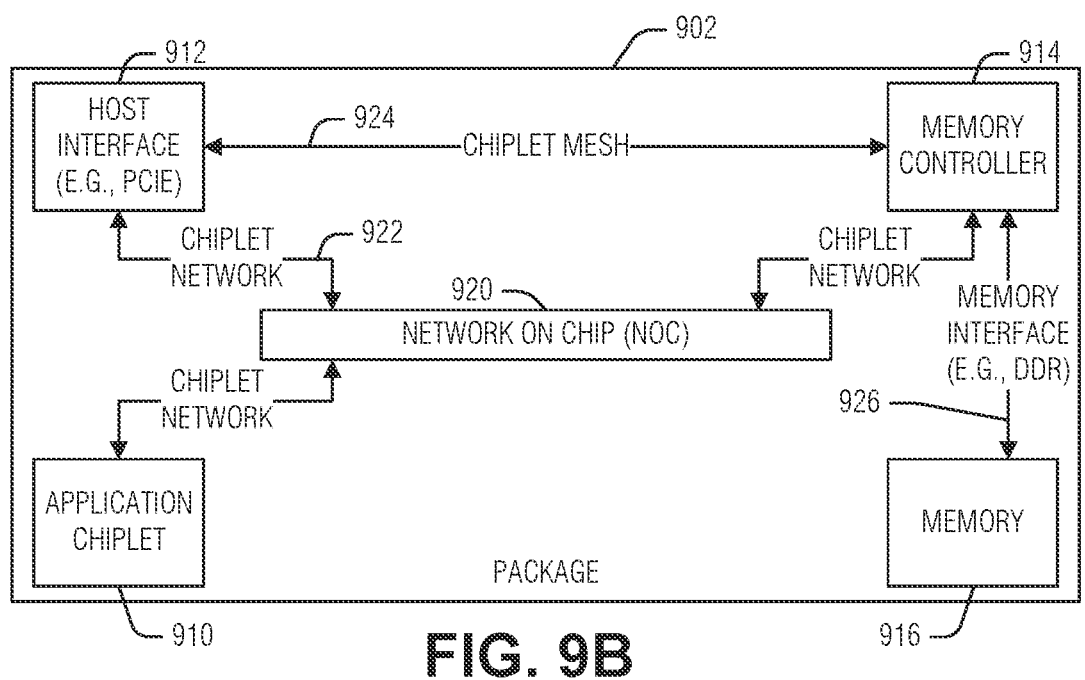
FIG. 9B illustrates generally a block diagram showing various components in the chiplet system from the example of FIG. 9A.

A compute-near-memory system, or nodes or components of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits than single die chips, including higher yields or reduced development costs. FIG. 9A and FIG. 9B, discussed below, illustrate generally an example of a chiplet system such as can comprise a compute-near-memory system.

The compute-near memory system, including the components of the memory devices contained therein, lend themselves to parallel processing tasks. A typical paradigm in parallel programs involves a group of cooperating threads that concurrently operate on portions of the program. There can be segments of the program-sometimes called critical regions—that require synchronization e.g., single thread access) on shared resources (e.g., data, memory location, device state, etc.) to ensure data consistency. Locking primitives are frequently used to ensure that only a single thread at a time can operate in these critical regions. The efficiency of the locking mechanism can significantly impact the parallel execution efficiency; an issue that grows significantly with a large number of threads or fine-grained parallelism.

Acquisition and release of a traditional locking mechanism are both operations that limit efficiency. The release mechanism typically shares the same resource as the locking mechanism. The cost of this shared mechanism can be a limiting factor on parallel efficiency. Further limitations on efficiency can occur when one or more threads attempt to acquire the lock while the thread holding the lock attempts to release the lock. Because only one thread at a time can control the shared locking resource, a bottleneck is created as the controlling thread attempts to release the lock while the other threads attempt to acquire the lock.

To address the locking inefficiencies of current techniques, a scalable locking primitive is used in which the lock is passed between threads through an event messaging system. The lock itself is a value generally indicating a last-link in a first-in-last-out chain of threads waiting for the resource. Thus, a thread simply reads and holds the lock value so the thread knows which thread to message when the thread is done with the resource, effectively passing the lock to the next link in the chain. The thread then replaces the lock value with its own identifier in case another thread arrives and is added to the end of the chain. The first and last thread in a chain behave slightly differently to establish the lock, pass the lock from one chain to another, or clear the lock altogether as described below. The technique eliminates contention on the lock value itself as each thread simply reads and updates the lock value. When the update is performed by an atomic operation at a memory controller, contention between the threads is completely eliminated by the hardware. The disclosed lock release mechanism largely eliminates the congestion inherent in traditional locking mechanisms, improving parallel efficiency. The parallel efficiency increases over traditional locking mechanisms for applications with periods of significant lock contention over a large number of threads.

The locking mechanism described herein is generally applicable in architectures with messaging between threads. The use of an atomic operation, whether built-in or programmable simplifies issues are changing the lock value. The following discussion of FIGS. 1-5 relate to various hardware architectures that enable thread-level messaging and atomic operations for parallel programs. Additional details and examples of the locking mechanism are described below (e.g., references FIGS. 6-8 and 12).

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced extensible Interface (AXI) is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
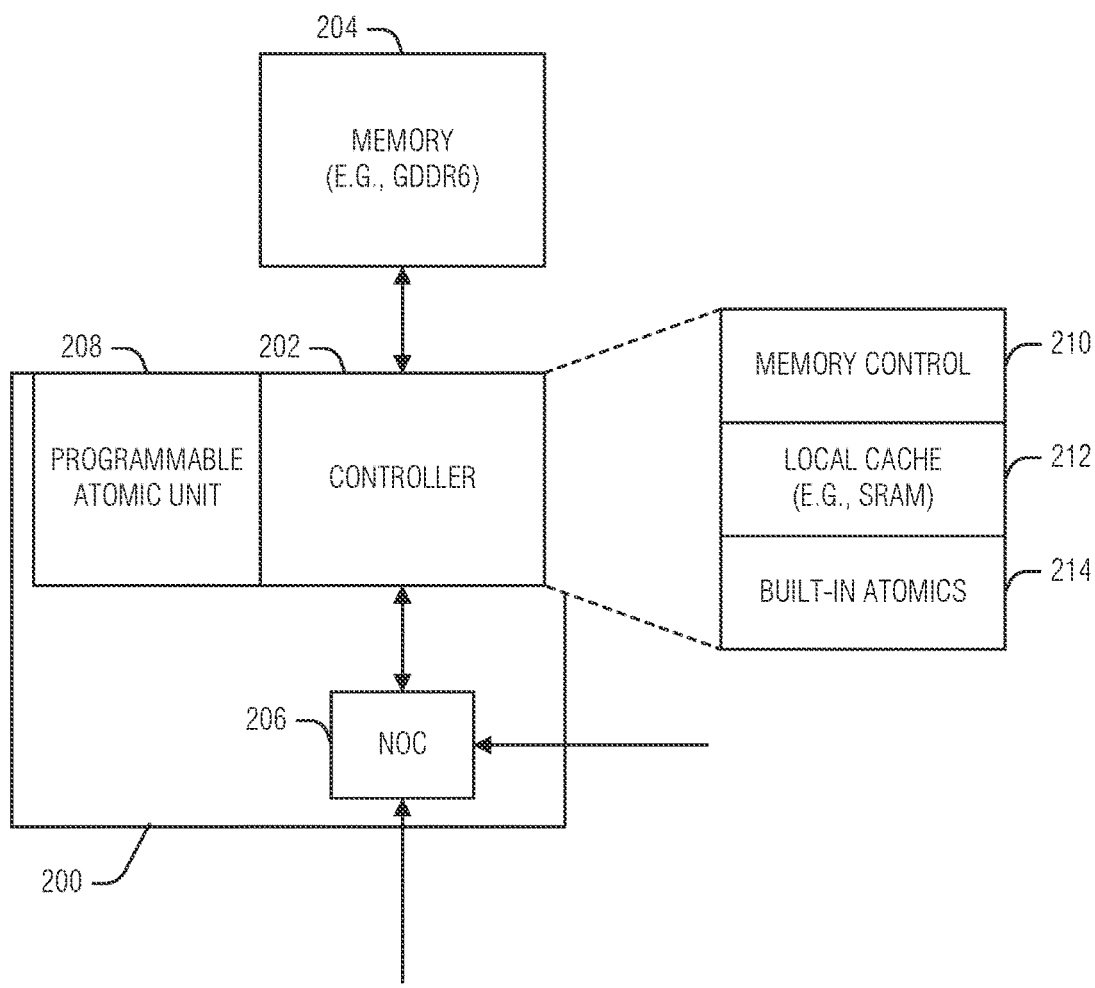
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
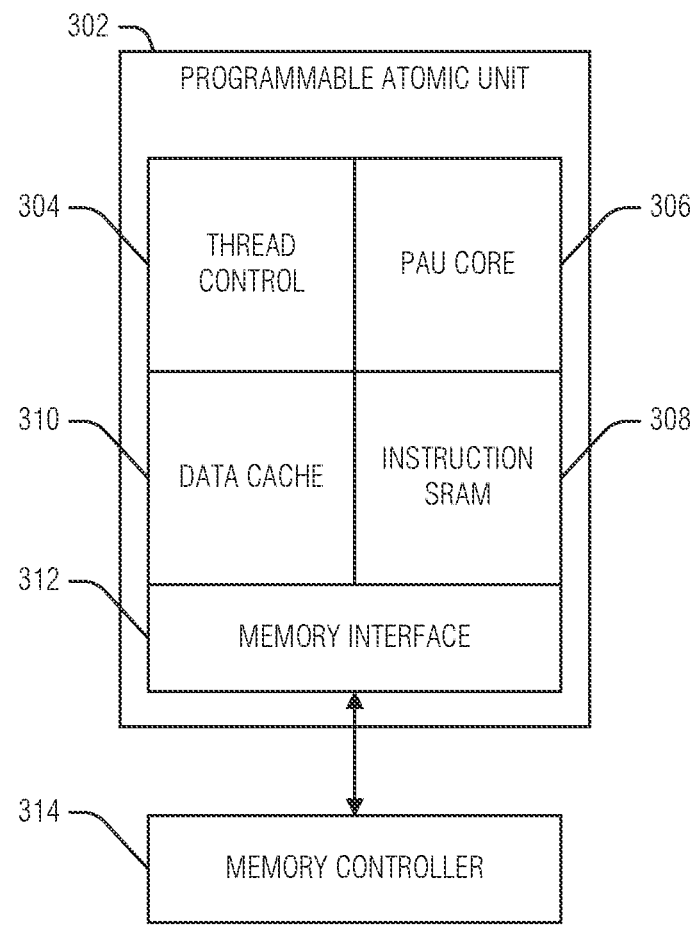
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) in memory local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the data cache 310 or instruction SRAM 308 inside the PAU. If the cache line is dirty, then the built-in atomic operator will not be operating on the most current data until the data cache 310 is flushed to synchronize the cache and the other or off-die memories. This same situation could occur with other hardware blocks of the memory controller, such as cryptography block, encoder, etc.

Figure 4:
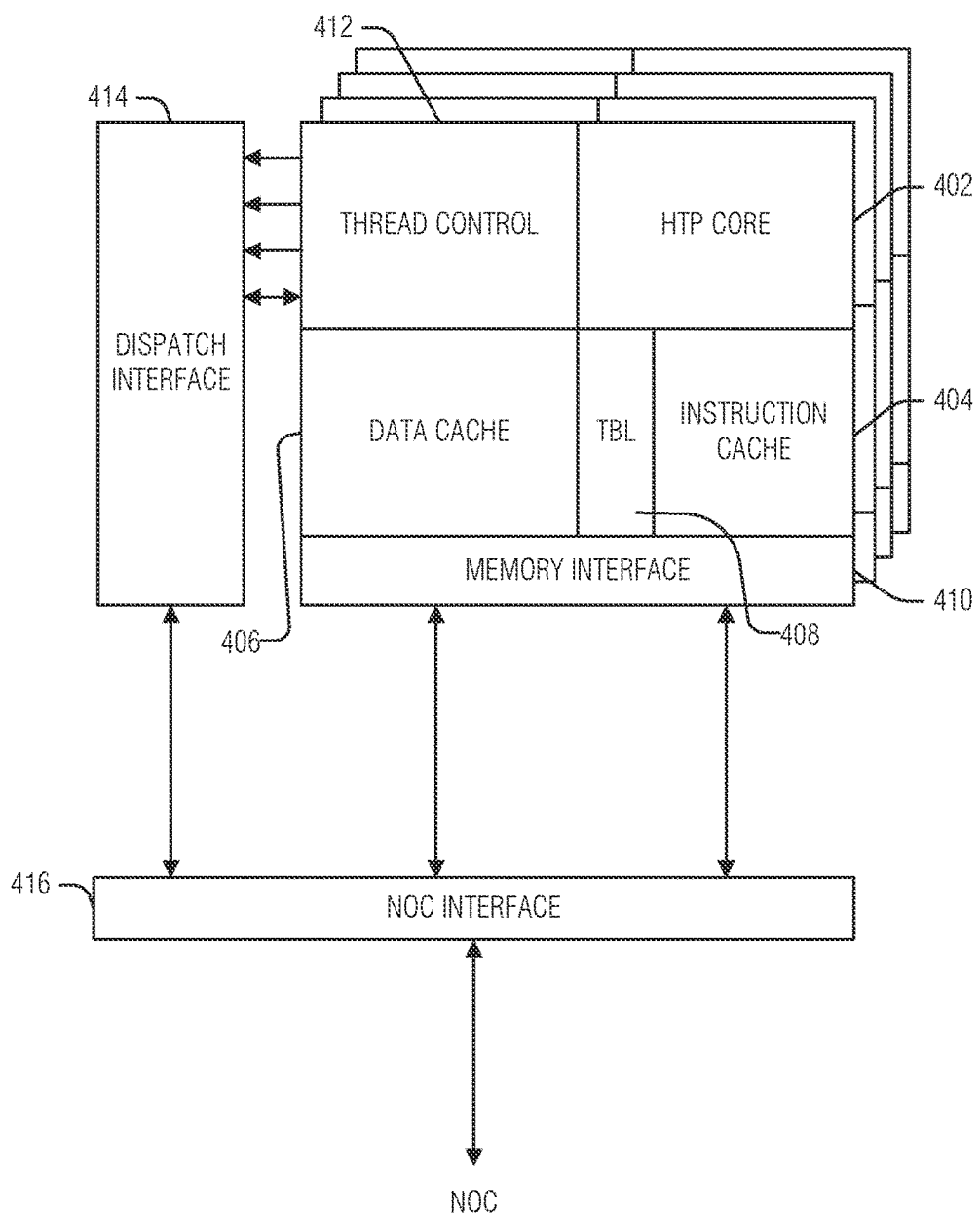
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators, Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
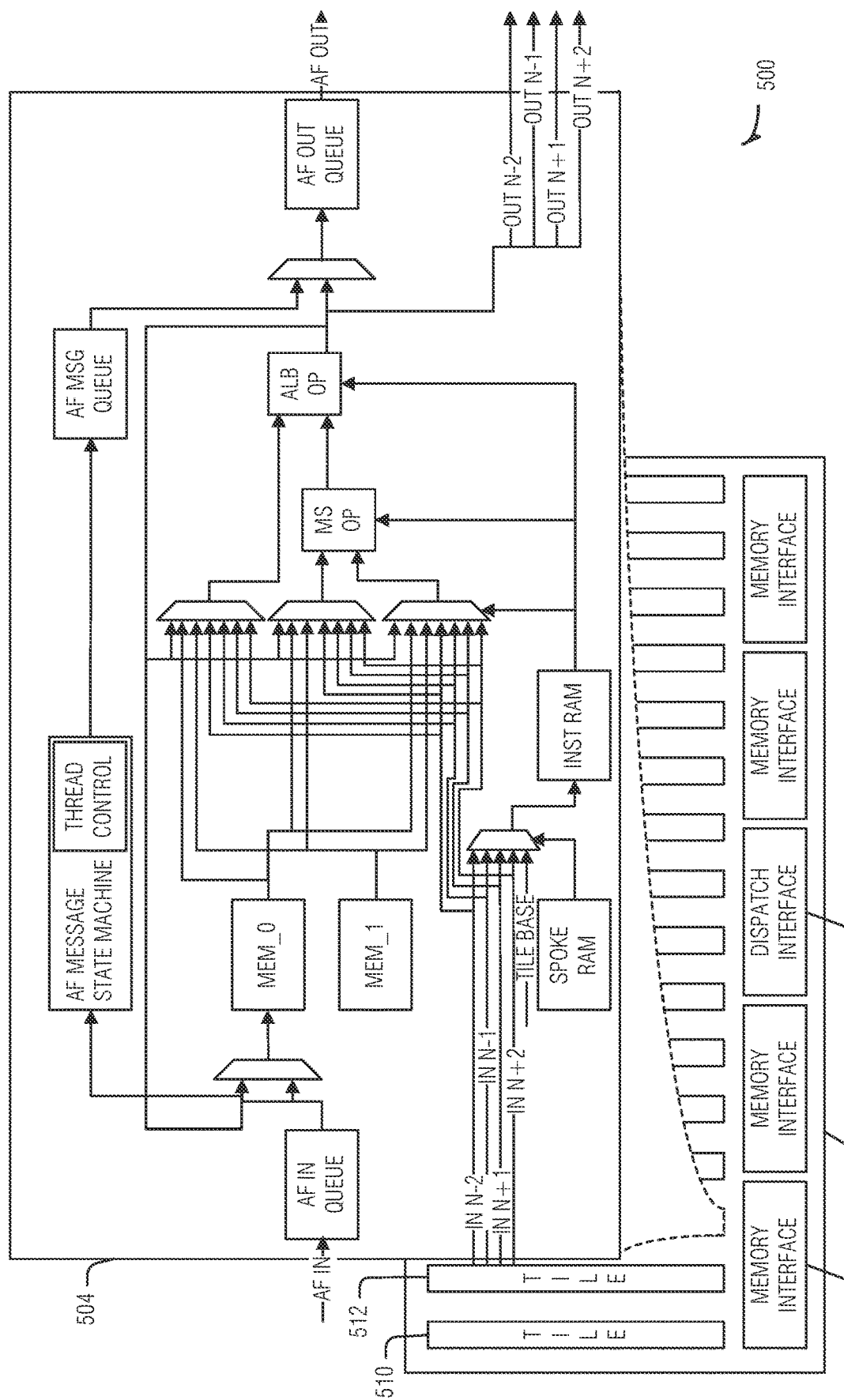
FIG. 5 illustrates an example of a representation of a hybrid threading fabric (HTF) of a memory-compute device, according to an embodiment.

FIG. 5 illustrates an example of a representation of a hybrid threading fabric (HTF), or HTF 500, of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can include one or more compute elements with local memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 5, the tiles comprising the HTF cluster 502 are linearly arranged, and each tile in the cluster can be coupled to one or multiple other tiles in the HTF cluster 502. In the example of FIG. 5, the example tile 504, or Tile N, is coupled to four other tiles, including to a base tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid or other configuration, with each tile similarly coupled to one or several of its nearest neighbors in the grid. Tiles that are provided at an edge of a cluster can optionally have fewer connections to neighboring tiles. For example, Tile N−2, or the base tile 510 in the example of FIG. 5, can be coupled only to the adjacent tile 512 (Tile N−1) and to the example tile 504 (Tile N). Fewer or additional inter-tile connections can similarly be used.

The HTF cluster 502 can further include memory interface modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 5, the tiles in the HTF cluster 502 are coupled using a synchronous fabric (SF). The synchronous fabric can provide communication between a particular tile and its neighboring tiles in the HTF cluster 502, as described above. Each HTF cluster 502 can further include an asynchronous fabric (AF) that can provide communication among, e.g., the tiles in the cluster, the memory interfaces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous domain pipeline in a tile, the control information can arrive at a tile a few clock cycles before the data field. Various registers can be provided to help coordinate dataflow timing in the pipeline.

In an example, each tile in the HTF cluster 502 can include multiple memories. Each memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous domain, or can include a result of a load operation such as initiated by another synchronous domain. The tile memory can be read via synchronous data path instruction execution in the synchronous domain.

In an example, each tile in an HTF cluster 502 can have a dedicated instruction RAM (INST RAM). In an example of an HTF cluster 502 with sixteen tiles, and instruction RAM instances with sixty-four entries, the cluster can allow algorithms to be mapped with up to 1024 multiply-shift or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs and can support nested looping kernels.

The synchronous fabric can allow multiple tiles to be pipelined, such as without a need for data queuing. Tiles that participate in a synchronous domain can, for example, act as a single pipelined data path. A first or base tile (e.g., Tile N−2, in the example of FIG. 5) of a synchronous domain can initiate a thread of work through the pipelined tiles. The base tile can be responsible for starting work on a predefined cadence referred to herein as a Spoke Count. For example, if the Spoke Count is 3, then the base tile can initiate work every third clock cycle.

In an example, the synchronous domain comprises a set of connected tiles in the HTF cluster 502. Execution of a thread can begin at the domain's base tile and can progress from the base tile, via the synchronous fabric, to other tiles in the same domain. The base tile can provide the instruction to be executed for the first tile. The first tile can, by default, provide the same instruction for the other connected tiles to execute. However, in some examples, the base tile, or a subsequent tile, can conditionally specify or use an alternative instruction. The alternative instruction can be chosen by having the tile's data path produce a Boolean conditional value, and then can use the Boolean value to choose between an instruction set of the current tile and the alternate instruction.

The asynchronous fabric can be used to perform operations that occur asynchronously relative to a synchronous domain. Each tile in the HTF cluster 502 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 502 can perform various compute operations for the HTF. The compute operations can be performed by configuring the data path within the tile. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the base tile input) is the primary input for each clock cycle. The Spoke RAM read address input can originate at a counter that counts from zero to Spoke Count minus one. In an example, different spoke counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

Figure 6:
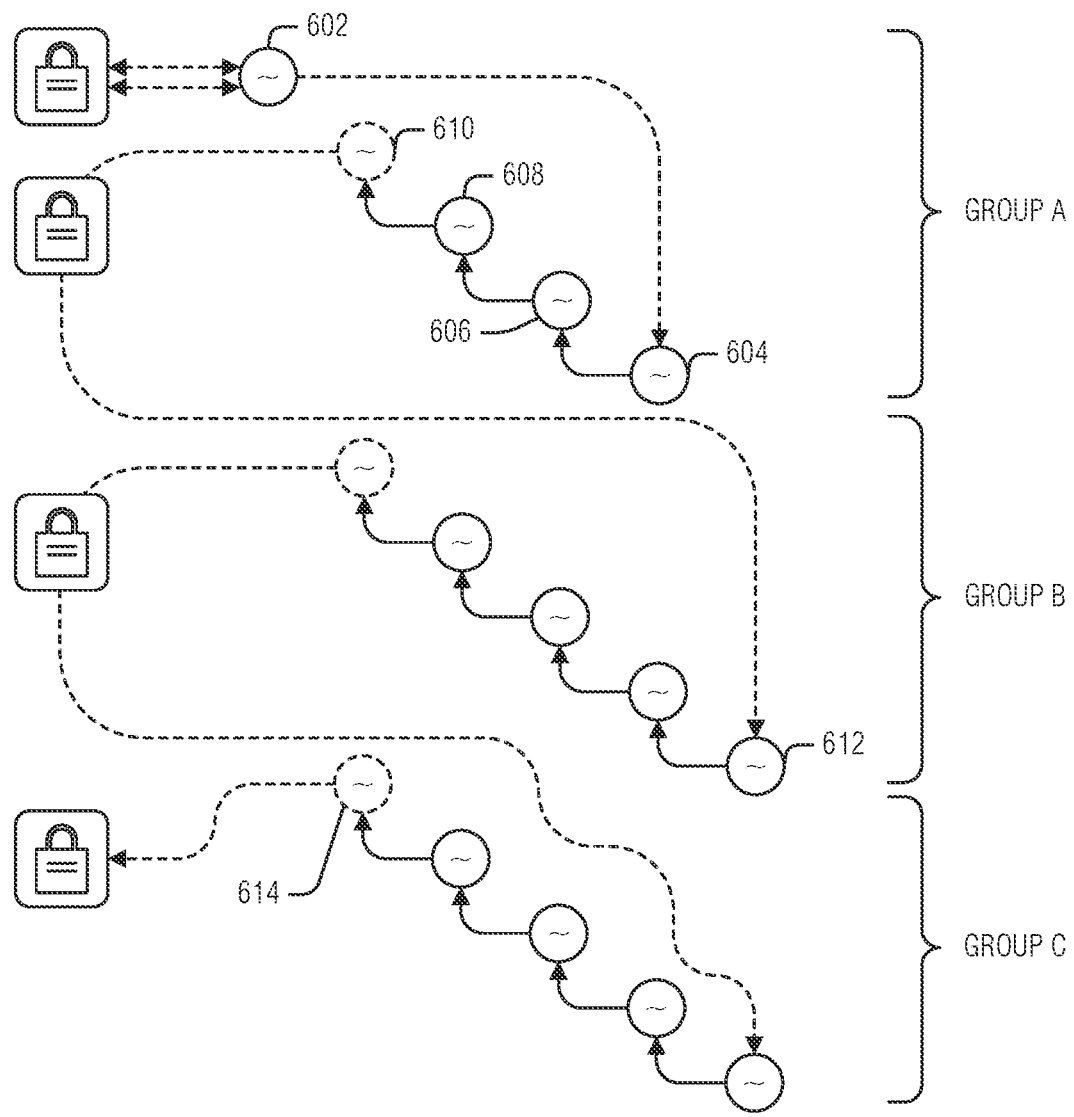
FIG. 6 illustrates an example of CHAINED RESOURCE LOCKING with multiple chains, according to an embodiment.

FIG. 6 illustrates an example of CHAINED RESOURCE LOCKING with multiple chains, according to an embodiment. Although the techniques can be used on any hardware that supports inter-thread messaging, the preceding hardware provides a useful context. For example, processing circuitry in an HTP (e.g., the HTP 400) or an HTF (e.g., HTF 500) can serve to execute threads, maintained thread state, or receive messages for threads. The messages can be transmitted from these endpoints through a network-on-chip (e.g., the NOC 920, the NOC endpoints, the NOC edge 1014, or the NOC Hub 1010), a scale fabric (e.g., the scale fabric 106), or the like.

As an overview, threads contending for a lock on a shared resource form last-in-first-out (LIFO) chains. As a given thread releases the lock, instead of changing the lock value (e.g., contents of a data store) and another group of threads attempting to acquire the lock, the thread messages the next thread in the chain. There are special cases for threads initially acquiring the lock or being the last in a chain.

For example, using the elements illustrated in FIG. 6, the first thread 602 reads the lock value and determines that the lock is unlocked. Thread 602 changes the lock value to locked (indicating to subsequent threads that the shared resource is unavailable) and continues its execution using the shared resource.

While thread 602 is using the shared resource, thread 610 reads the lock value and determines that the lock is locked. The thread 610 updates the lock value with its own identifier and pauses (e.g., sleeps). Subsequent threads 608, 606, and 604 also arrive while thread 602 is holding the lock. Each of these subsequent threads reads the lock value, acquires the identifier to the preceding thread, and replaces the lock value with its own identifier, creating the illustrated chain labeled as GROUP A. Thus, the lock value holds only the identifier of the last thread to arrive.

When the thread 602 is done with the shared resource, the thread 602 releases the lock. To release the lock, the thread 602 reads the lock value and determines that a thread identifier (for the last-to-arrive thread 604) is present. The thread 602 changes the lock value to locked (indicating that the resource is locked but no chain is accepting new elements) and sends a wake message to the thread 604 using the identifier retrieved from the lock value. The thread 604 wakes upon the message and continues execution using the shared resource. When the thread 604 is done with the shared resource, the thread 604 uses the thread identifier for 606, which was acquired when the thread 604 first read the lock value, to send a wake message to the thread 608. The thread 608 does the same to wake the thread 610. In this way, the lock is released and acquired by the threads 604-610 without any interaction with the lock value aside from the initial interaction. This eliminates the lock value as a bottleneck while the lock is being passed down the chain of GROUP A.

The stored lock value of the thread 610 simply indicates a lock (e.g., it is not a thread identifier), meaning that the thread 610 is the last in the chain. This special case has two outcomes. If no other threads arrived while the GROUP A chain held the lock, the thread 610 changes the lock value to unlocked. Here, the next thread to try and acquire the lock will behave like the thread 602 and the process starts over. However, if other threads arrive while the GROUP A chain holds the lock, then these threads will form a new chain, here illustrated as GROUP B. As group B forms, the lock value is updated to include the identifier for the last thread added. When the thread 610 seeks to release the lock, the thread 610 reads the lock value. If the lock value is simply locked, as set when the thread 602 passed the lock to the thread 604, then the thread 610 changes the lock value to unlocked. However, if, as illustrated, the lock value holds a thread identifier, this means that an additional chain is started (e.g., GROUP B). The thread 610 then changes the lock value to be locked, and sends a message to the thread 612 based on the identifier in the lock value to start the GROUP B chain.

As illustrated, while the GROUP B chain holds the lock, a GROUP C chain forms and is started when the GROUP B chain completes. The last thread in the GROUP C chain, thread 614, reads the lock value and determines that is simply locked (e.g., it is not a thread identifier), indicating that no other chains have formed. Here, the thread 614 changes the lock value to be unlocked. At this point, the process can start over with a new initial thread (e.g., the thread 602).

In general, the processing circuitry is configured to execute a thread, where the thread obtains a value for a lock of a resource. The lock is embodied in a storage component that can hold data (e.g., a register, solid-state memory, etc.) that is the value. In an example, the lock value is one of unlocked, locked, or a thread identifier. In an example, the lock value is a sixty-four bit value, or other bit count sufficient to hold a thread identifier. In an example, the lock value of a logical zero corresponds to unlocked, a lock value of a logical one corresponds to locked, and all other values correspond to thread identifiers. In an example, only a lock value of unlocked (e.g., zero) indicates that the lock is free to obtain. All other values in this example indicate that the lock is being held by another thread.

Once the thread obtains the value of the lock, a determination is made that the value corresponds to a thread identifier. As noted in the illustrated example, the presence of the thread identifier indicates that the resource is locked and that a chain has already been formed. When it is determined that the thread is attaching to a chain, the thread identifier from the lock value is stored by the thread, the lock value is updated with the thread's own identifier, and the thread is paused (e.g., put to sleep). This storage can include writing the thread identifier to memory or storage controlled by the thread or updating a thread state to include the thread identifier. Generally, the processing circuitry will persist thread state (e.g., in a register file for the thread).

The thread remains asleep until it is awakened by a first wake message that corresponds to the resource. Here, the wake message is an event in accordance with the hardware executing the thread, and the wake message is specific to the thread as well as the resource to which the lock applies. By waiting until another thread passes the lock to this thread through the wake message event, this thread does not consume resources, other than to maintain the thread state, while the shared resource is unavailable.

Once the thread is awakened by the first wake message, the thread continues execution because it is able to use the resource. Effectively, the thread now holds the lock for the resource even though the thread did not interact with the lock itself. Once the thread is done using the resource, the thread releases the lock by sending a second wake message that includes the thread identifier previously stored by the thread to awake another thread (e.g., the thread next in the LIFO chain) to use the resource.

The storage component of the lock can be accessible though a memory controller (e.g., the memory controller 200). In an example, atomic operations-such as a built-in atomic (e.g., implemented in the built-in atomics unit 214) or a programmable atomics (e.g., implemented in the PAU 208 or the PAU 302—can be used to provide contention free access to read or write the value of the lock. In an example, a single atomic operation can be used by a thread to attempt to acquire the lock. Here, the thread identifier is used as an argument or metadata to the atomic operation. The atomic operation then uses the current value of the lock value as a return value and updates the lock value with the thread identifier if the lock value is a thread identifier or locked, or with locked if the lock value is unlocked.

The following examples refer to a second (e.g., different) thread to illustrate some additional scenarios. Much like above, the second thread obtains the value of the lock. In an example, the lock value is obtained in a return value of an atomic operation to acquire the lock on the memory controller. That is, when the second thread uses the atomic operation in an attempt to acquire the lock. If the value of the lock indicates that the lock is locked (e.g., the value is locked or a thread identifier), the second thread will not acquire the lock, but will be added to a chain awaiting the lock. In an example, ff the value of the lock is unlocked, the atomic operation can set the lock by changing the value to locked.

After the value of the lock is obtained by the second thread, the second thread can determine whether the value is unlocked or locked (e.g., either a thread identifier or the locked value), perform an action based on the value, and release the lock. The behavior of the second thread can be based on a combination of the value of the lock when the second thread attempted to acquire the lock and the value of the lock when the second thread releases the lock. When the value of the lock is a thread identifier when obtained by the second thread, the second thread releases the lock by an event message (e.g., a third wake up message) to the thread of the thread identifier, as described above. In this release scenario, the value of the lock is not changed.

In an example, when the value of the lock that is obtained upon an initial attempt to acquire the lock is unlocked, the thread releases the lock by reading a current value of the lock. If the current value of the lock is a thread identifier, the second thread changes the lock value to locked and sends the third wake-up message to the thread of the thread identifier. This scenario is similar to that described above with respect to the thread 602. If the current value of the lock is locked (e.g., not unlocked or a thread identifier), then the second thread simply changes the value of the lock to unlocked.

In an example, when the value of the lock that is obtained upon the initial attempt to acquire lock is locked, the thread releases the lock by reading the current value of the lock. This scenario occurs when the thread is at the end of a chain, such as thread 610. Here, the second thread messages another thread when the current value of the thread is a thread identifier (e.g., the message from the thread 610 to thread 612) and changes the value of the lock to unlocked otherwise because there are no more chains to pass the lock to.

In an example, to release the lock, an atomic operation is performed to release the lock. In an example, to release the lock, a current value of the lock is obtained. As discussed above, the atomic operation can provide the current value of the lock as a return value to the atomic operation to release the lock. The second thread in these examples represents a thread that was either the first thread (e.g., like the thread 602) or a thread at the end of a chain (e.g., like the thread 610). In these examples, the lock release atomic operation performs the update of the lock value. Because only threads that had an initial lock value of locked or unlocked (e.g., not a thread identifier) execute the lock release atomic operation, the lock release atomic operation can read the value of the lock and set it to unlocked if the value is locked and locked otherwise. Thus, the thread need only perform a single operation with the memory controller to release the lock outright or pass the lock to another chain. In an example, to facilitate multi-node environments, the atomic operation address is accessible from every one of the multiple nodes.

Thus, the atomic operation can be initiated by a thread on one node to be performed by a PAU on another node where the address is co-located.

The preceding examples illustrate a resource locking mechanism that reduces contention on the mechanism itself because threads within LIFO chains simply pass the lock down the chain using inter-thread messages. The LIFO nature of the chains may be considered unfair as earlier arriving threads acquire the lock last in the chain, but this is mitigated in practice due to several reasons. First, threads that complete earlier in one round of resource use, tend to arrive earlier in a subsequent round. Accordingly, a thread that is at the end of a LIFO chain in a first instance, will finish later in that insistence, arrive later in a subsequent instance, and thus likely finish earlier in that subsequent instance. On balance, no single thread tends to be delayed more than others. Second, because the LIFO chains form only while a previous chain is using the lock, the length of the chains is limited, limiting the total time a given thread waits for the lock. In any case, the reduction in interactions with the lock itself, especially in highly parallel or contentious situations, significantly increases throughput of parallel operations when the present techniques are used.

Figure 7:
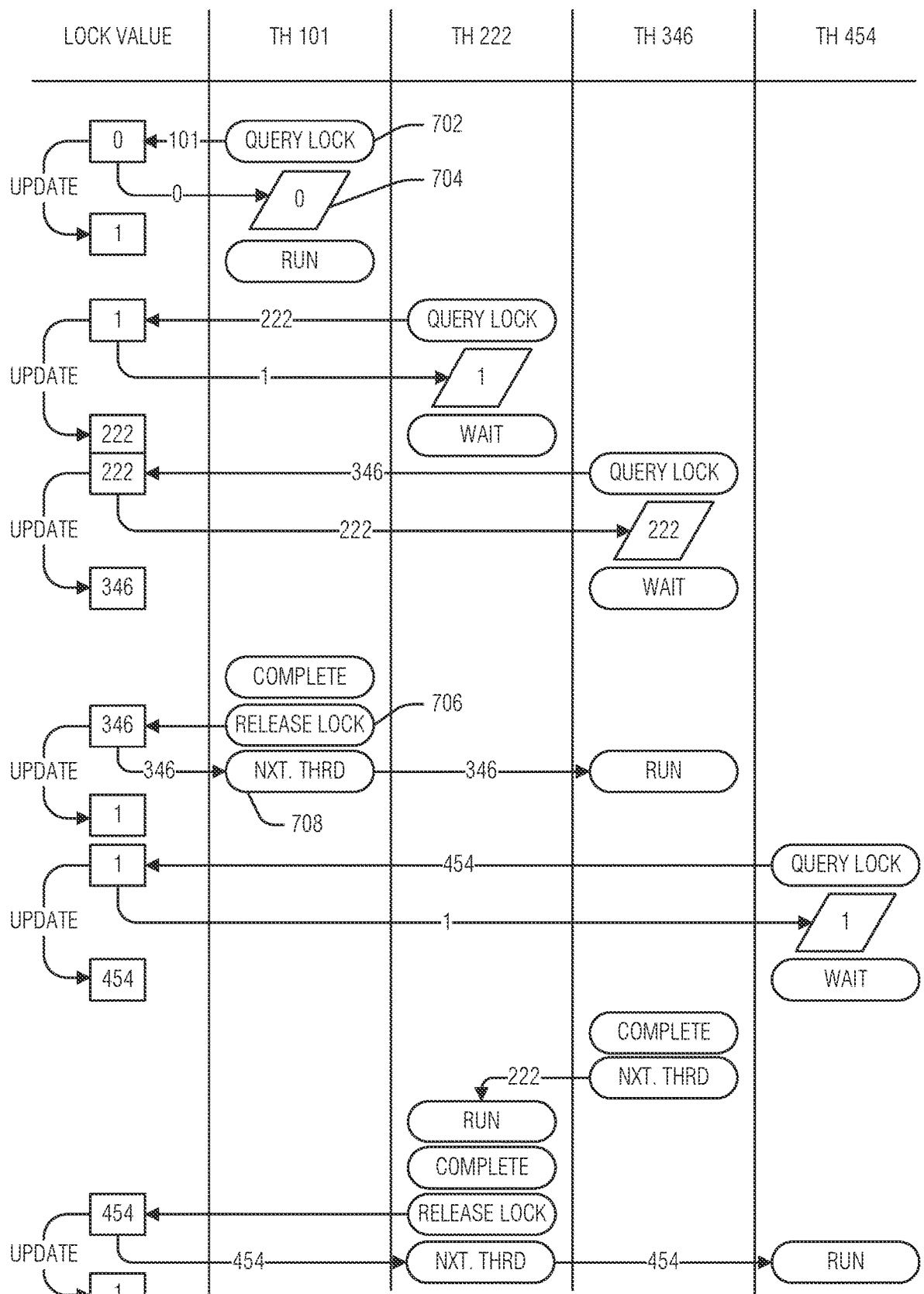
FIG. 7 illustrates an example of interactions between threads and a lock during CHAINED RESOURCE LOCKING, according to an embodiment.

FIG. 7 illustrates an example of interactions between threads and a lock during CHAINED RESOURCE LOCKING, according to an embodiment. Thread 101 queries the lock value (operation 702) by, for example, sending its identifier (101) in an atomic operation. At this point, the lock value is zero (e.g., unlocked). The atomic operation returns the current lock value to thread 101 and updates the lock value to one (e.g., locked). The returned lock value is stored 704 in thread 101. Because the lock value is unlocked, thread 101 continues its execution using the shared resource.

While thread 101 is executing, thread 222 arrives the queries the lock value with its identifier 222. The current lock value of one is returned and the lock value is updated to 222. The current lock value of 1 is stored in thread 222. Because the current lock value is not unlocked, thread 222 waits (e.g., sleeps, ceases execution, etc.). A similar sequence occurs with thread 346, except that the returned value of the lock is the previous thread's identifier 222.

Thread 101 completes its use of the resource and releases the lock (operation 706) by another atomic operation. The atomic operation returns the current value of the lock, the identifier for thread 346, and updates the lock value to one (e.g., locked). Thread 101, seeing that the returned value of the lock is not one, transmits (operation 708) a wake message to thread 346. Thread 346 is awakened by the message from the thread 101, and continues its execution using the shared resource.

While the chain of threads 222 and 346 is using the lock, thread 454 arrives, queries the lock, and acquires the current lock value of one (e.g., locked). This starts another LIFO chain.

Thread 346 completes and releases the lock to thread 222 by a wake message. Note, in this case, thread 346 does not interact with an entity other than sending the message. Rather, the next link in the chain, thread 222, was acquired when the thread 346 first attempted to acquire the lock. During high contention of the resource, most interactions will be of this nature, reducing interaction with the lock value altogether.

Once the thread 222 completes, its initially lock value of one means that it is at the end of a chain. Here, the thread releases the lock and receives the identifier for thread 454 in return. Again, the atomic operation updates the lock value to locked and the thread 222 messages the thread 454 to wake thread 454 and release the lock to the thread 454.

Figure 8:
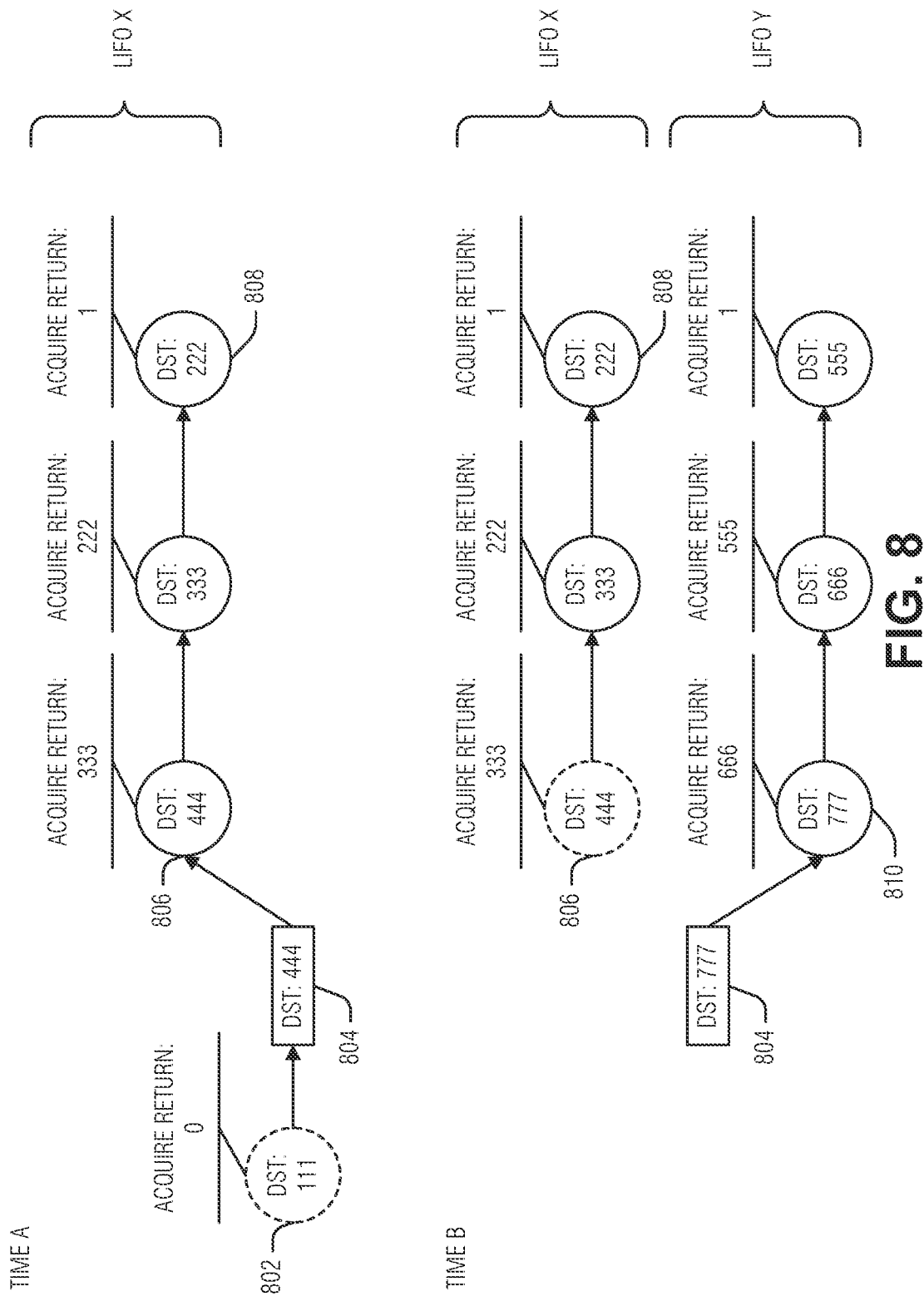
FIG. 8 illustrates an example of state in threads and a lock during CHAINED RESOURCE LOCKING, according to an embodiment.

FIG. 8 illustrates an example of state in threads and a lock during CHAINED RESOURCE LOCKING, according to an embodiment. In this example, a single shared 64-bit value in memory can be used to store the lock state. A PAU can be used to execute a set of instructions dependent on the current lock value. The PAU ensures that only one thread at a time can access the lock value. Threads that request the lock while another thread holds the lock are organized into a LIFO queue (e.g., chain).

The hardware can support an event mechanism between cooperating threads acquiring the lock. In an example, each thread has a unique 64-bit destination value that is used by a sending thread to specify the thread that should receive the event. Threads waiting on event messages pause execution until the event is received, avoiding inefficiencies, such as constant looping or polling by waiting threads. The sending thread sends a 64-bit value in the event message. When the receiving thread receives the event, it receives this 64-bit value and resumes execution. In an example, to facilitate multi-node environments, the destination value (e.g., event destination) is globally unique across all nodes in the multi-node environment. This enables threads on a first node to send events to a threads on other nodes.

In an example, upon lock creation the lock value is initialized to 0. When a thread issues a locking request to the PAU, the thread specifies the address of the lock value and its own event destination value. When a thread that is holding the lock release the lock, it specifies the value that was returned at lock acquisition time.

There are three scenarios for lock acquisition. First, if the current lock value is 0—which indicates the lock is available—the lock value is set to 1 and the previous lock value of 0 is returned to the locking thread. Here, thread 802 received a return value of zero, indicating that thread 802 has the lock (indicated by the dashed circle). Although thread 802 provided the destination value of 111 to the PAU, the lock value is changed to 1. This indicates that the lock is held, but that the holder of the lock does not benefit by a wake-up message because the holder is already using the shared resource.

Second, the current lock value is 1, which indicates the lock is held by another thread and that this thread is the first requesting thread since the lock was acquired. Thread 808 fits this scenario. As such, this thread will be placed at the end of a chain of threads in the LIFO queue. The lock value is set to the requesting thread's event destination of 222 and the previous value of 1 is returned to the requesting thread (thread 808). Based on a non-zero return value, the requesting thread determines that the lock is held by another thread, so it waits (e.g., calls a function to block until an event is received which will indicate lock acquisition).

Third, the current lock value is not 0 and not 1, which indicates the lock is held by another thread and this thread is not the first requesting thread since the lock was acquired. As illustrated, this third scenario is true for the other threads with destination addresses of 333 and 444 in LIFO X. This thread will be placed in the chain of threads in the LIFO queue. The lock value is set to the calling thread's event destination value, and the previous lock value specifying the most recent thread placed in the LIFO is returned to the requesting thread. This non-zero return indicates to the requesting thread that the lock is already held, again triggering a blocking call to receive an event.

As with lock acquisition, lock release has three scenarios. The first scenario occurs when the value returned to the thread at lock acquisition was 0. At the time of lock acquisition, no other threads were requesting the lock. The unlocking thread calls the PAU to request lock release. If the current lock value is 1—which indicates that no other threads have requested the lock—the lock value is set to 0—which indicates that the lock is available—and 0 is returned to the unlocking (e.g., releasing) thread. The return value of 0 indicates no further lock processing is required by this thread. If the current lock value holds the event destination of the most recent thread placed into the LIFO queue, then the lock value is set to 1 and the event destination is returned to the releasing thread. This non-zero return value indicates the releasing thread should send an event to the destination specified by the return value to pass the lock to that thread. An example of this scenario is illustrated when thread 802 checks the current lock value 804 and receives the destination 444 in return, releasing the lock to thread 806.

The second scenario occurs when the value returned to the thread at lock acquisition was 1. This indicates to the unlocking thread that is the end of a chain of threads in the LIFO queue. The unlocking thread calls the PAU to request lock release. This thread operates the same as the thread in the first scenario depending upon the return value from the lock release request.

The third scenario occurs when the value returned to the thread at lock acquisition was not 0 and not 1. Other threads are in the LIFO queue, and the return value provides the event destination of the most recent thread placed into the LIFO. This event destination is returned to the thread during acquisition. Thus, this thread is not required to issue a PAU request to release the lock. Rather, the releasing thread sends an event to the destination specified.

While the lock is held and a chain of threads in the LIFO (e.g., LIFO X) are acquiring and releasing the lock in order, another chain of threads requesting the lock can be started (e.g., (LIFO Y), which will eventually be processed using the mechanism detailed above. Note that, when LIFO X is complete (e.g., the thread 808 releases the lock), the thread 808 obtains the current lock value 804 in return for a request to the PAU to release the lock. The thread 808 determines that the current lock value is a destination address 777, and sends the event to the thread 810 based on the destination address 777 to transfer the lock to LIFO Y.

The described lock release mechanism performs better than traditional techniques during high lock contention. In that scenario, most threads will be placed into the chain of threads in the LIFO queue and, as a result, will not have to call the PAU to release the lock. Traditional locking mechanisms generally require atomic operations to release the lock by every thread, with bottlenecks inherent to the lock congestion.

Locking mechanisms typically strive for lock fairness-implying each thread requesting the lock will have an equal chance of acquiring the lock. With the use of a LIFO, a thread that arrives early doesn't acquire the lock until every thread that requested the lock after this thread's request is done with the lock. Intuitively this seems to provide a mechanism that is inherently unfair, penalizing threads that arrive early. However, in periods of heavy lock congestion, threads that arrived early requesting the lock in the current epoch tend to arrive late requesting the lock in the next epoch, thus providing a balanced approach to the fairness issue. In cases with little lock contention, lock fairness is a non-issue.

FIG. 9A and FIG. 9B illustrate generally an example of a chiplet system that can be used to implement one or more aspects of the CNM system 102. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 9A and FIG. 9B illustrate generally an example of a chiplet system, according to an embodiment. FIG. 9A is a representation of the chiplet system 902 mounted on a peripheral board 904, that can be connected to a broader computer system by a peripheral component interconnect express (PCIe), for example. The chiplet system 902 includes a package substrate 906, an interposer 908, and four chiplets, an application chiplet 910, a host interface chiplet 912, a memory controller chiplet 914, and a memory device chiplet 916. Other systems can include many additional chiplets to provide additional functionalities as will be apparent from the following discussion. The package of the chiplet system 902 is illustrated with a lid or cover 918, though other packaging techniques and structures for the chiplet system can be used. FIG. 9B is a block diagram labeling the components in the chiplet system for clarity.

The application chiplet 910 is illustrated as including a chiplet system NOC 920 to support a chiplet network 922 for inter-chiplet communications. In example embodiments the chiplet system NOC 920 can be included on the application chiplet 910. In an example, the first NOC 118 from the example of FIG. 1 can be defined in response to selected support chiplets (e.g., host interface chiplet 912, memory controller chiplet 914, and memory device chiplet 916) thus enabling a designer to select an appropriate number or chiplet network connections or switches for the chiplet system NOC 920. In an example, the chiplet system NOC 920 can be located on a separate chiplet, or within the interposer 908. In examples as discussed herein, the chiplet system NOC 920 implements a chiplet protocol interface (CPI) network.

In an example, the chiplet system 902 can include or comprise a portion of the first memory-compute node 104 or the first memory-compute device 112. That is, the various blocks or components of the first memory-compute device 112 can include chiplets that can be mounted on the peripheral board 904, the package substrate 906, and the interposer 908. The interface components of the first memory-compute device 112 can comprise, generally, the host interface chiplet 912, the memory and memory control-related components of the first memory-compute device 112 can comprise, generally, the memory controller chiplet 914, the various accelerator and processor components of the first memory-compute device 112 can comprise, generally, the application chiplet 910 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 922. For example, the Advanced extensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 922.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 908. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 910, provides a sender, such as the memory controller chiplet 914, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 9A includes a chiplet mesh network 924 that uses a direct, chiplet-to-chiplet technique without a need for the chiplet system NOC 920. The chiplet mesh network 924 can be implemented in CPI, or another chiplet-to-chiplet protocol. The chiplet mesh network 924 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system can be through a desired interface (for example, a PCIe interface). Such an external interface can be implemented, in an example, through the host interface chiplet 912, which in the depicted example, provides a PCIe interface external to chiplet system. Such dedicated chiplet interfaces 926 are generally employed when a convention or standard in the industry has converged on such an interface. The illustrated example of a Double Data Rate (DDR) interface connecting the memory controller chiplet 914 to a dynamic random access memory (DRAM) memory device chiplet 916 is just such an industry convention.

Of the variety of possible support chiplets, the memory controller chiplet 914 is likely present in the chiplet system due to the near omnipresent use of storage for computer processing as well as sophisticated state-of-the-art for memory devices. Thus, using memory device chiplets 916 and memory controller chiplets 914 produced by others gives chiplet system designers access to robust products by sophisticated producers. Generally, the memory controller chiplet 914 provides a memory device-specific interface to read, write, or erase data. Often, the memory controller chiplet 914 can provide additional features, such as error detection, error correction, maintenance operations, or atomic operator execution. For some types of memory, maintenance operations tend to be specific to the memory device chiplet 916, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 914. In other chiplet systems, the atomic operators can be performed by other chiplets. For example, an atomic operator of "increment" can be specified in a command by the application chiplet 910, the command including a memory address and possibly an increment value. Upon receiving the command, the memory controller chiplet 914 retrieves a number from the specified memory address, increments the number by the amount specified in the command, and stores the result. Upon a successful completion, the memory controller chiplet 914 provides an indication of the command success to the application chiplet 910. Atomic operators avoid transmitting the data across the chiplet mesh network 924, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 914.

The memory device chiplet 916 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 916 as a chiplet, however, the device can reside elsewhere, such as in a different package on the peripheral board 904. For many applications, multiple memory device chiplets can be provided. In an example, these memory device chiplets can each implement one or multiple storage technologies, and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 914 can serve to coordinate operations between multiple memory chiplets in the chiplet system 902, for example, to use one or more memory chiplets in one or more levels of cache storage, and to use one or more additional memory chiplets as main memory. The chiplet system 902 can include multiple memory controller chiplet 914 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 10:
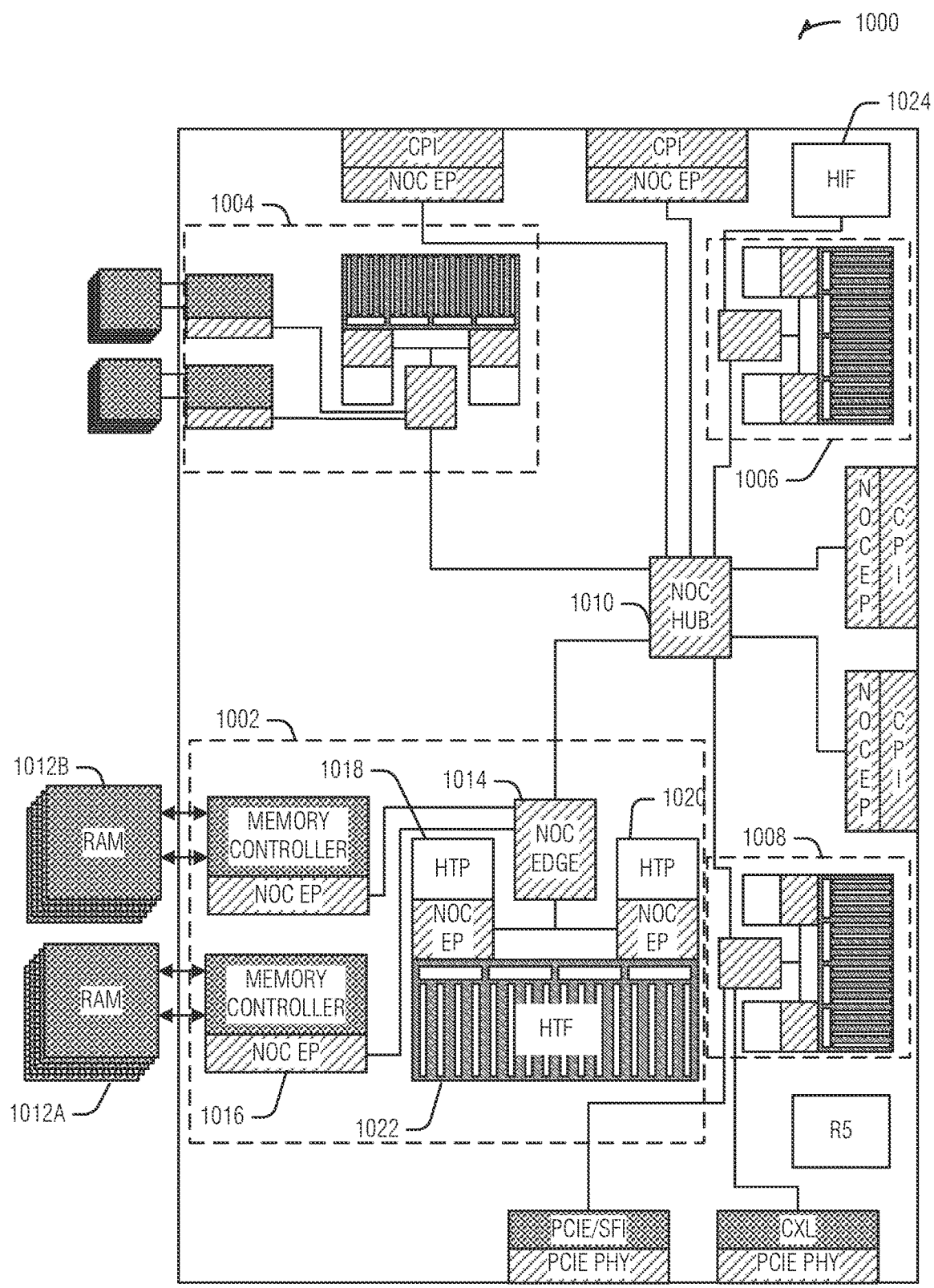
FIG. 10 illustrates generally an example of a chiplet-based implementation for a memory-compute device, according to an embodiment.

FIG. 10 illustrates generally an example of a chiplet-based implementation for a memory-compute device, according to an embodiment. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 902 from FIG. 9A and FIG. 9B.

The example of FIG. 10 includes a first CNM package 1000 comprising multiple chiplets. The first CNM package 1000 includes a first chiplet 1002, a second chiplet 1004, a third chiplet 1006, and a fourth chiplet 1008 coupled to a CNM NOC hub 1010. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 10, the first chiplet 1002 includes a first NOC hub edge 1014 coupled to the CNM NOC hub 1010. The other chiplets in the first CNM package 1000 similarly include NOC hub edges or endpoints. The switches in the NOC hub edges facilitate intra-chiplet, or intra-chiplet-system, communications via the CNM NOC hub 1010.

The first chiplet 1002 can further include one or multiple memory controllers 1016. The memory controllers 1016 can correspond to respective different NOC endpoint switches interfaced with the first NOC hub edge 1014. In an example, the memory controller 1016 comprises the memory controller chiplet 914 or comprises the memory controller 130, or comprises the memory subsystem 200, or other memory-compute implementation. The memory controllers 1016 can be coupled to respective different memory devices, for example including a first external memory module 1012*a* or a second external memory module 1012*b*. The external memory modules can include, e.g., GDDR6 memories that can be selectively accessed by the respective different chiplets in the system.

The first chiplet 1002 can further include a first HTP chiplet 1018 and second HTP chiplet 1020, such as coupled to the first NOC hub edge 1014 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 1022. The HTF chiplet 1022 can correspond to an HTF accelerator, such as the HTF 142 from the example of FIG. 1, or the HTF 500 from the example of FIG. 5.

The CNM NOC hub 1010 can be coupled to NOC hub instances in other chiplets or other CNM packages by way of various interfaces and switches. For example, the CNM NOC hub 1010 can be coupled to a CPI interface by way of multiple different NOC endpoints on the first CNM package 1000. Each of the multiple different NOC endpoints can be coupled, for example, to a different node outside of the first CNM package 1000. In an example, the CNM NOC hub 1010 can be coupled to other peripherals, nodes, or devices using CTCPI or other, non-CPI protocols. For example, the first CNM package 1000 can include a PCIe scale fabric interface (PCIE/SFI) or a CXL interface (CXL) configured to interface the first CNM package 1000 with other devices. In an example, devices to which the first CNM package 1000 is coupled using the various CPI, PCIe, CXL, or other fabric, can make up a common global address space.

In the example of FIG. 10, the first CNM package 1000 includes a host interface 1024 (HIF) and a host processor (R5). The host interface 1024 can correspond to, for example, the HIF 120 from the example of FIG. 1. The host processor, or R5, can correspond to the internal host processor 122 from the example of FIG. 1. The host interface 1024 can include a PCI interface for coupling the first CNM package 1000 to other external devices or systems. In an example, work can be initiated on the first CNM package 1000, or a tile cluster within the first CNM package 1000, by the host interface 1024. For example, the host interface 1024 can be configured to command individual HTF tile clusters, such as among the various chiplets in the first CNM package 1000, into and out of power/clock gate modes.

Figure 11:
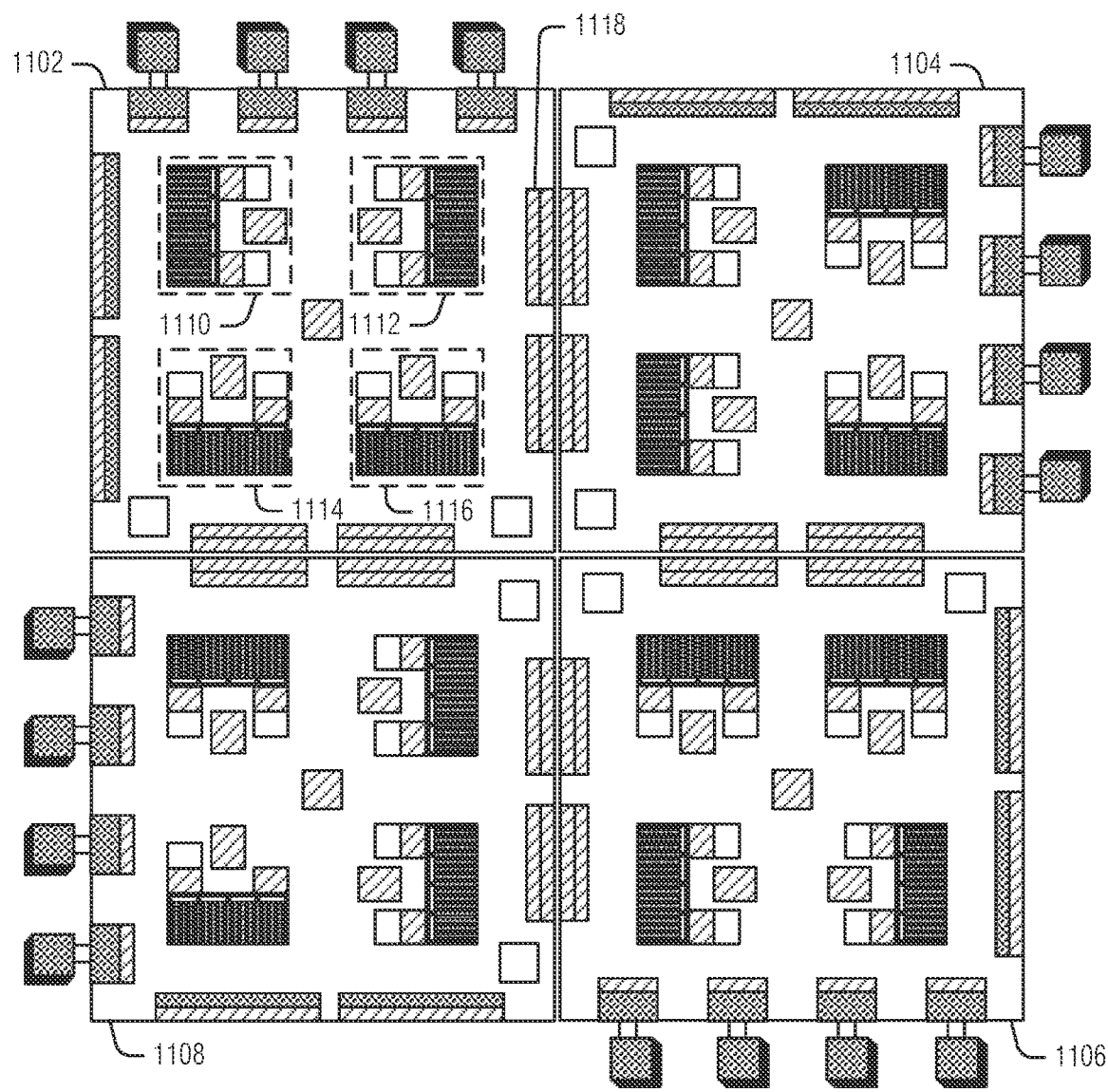
FIG. 11 illustrates an example tiling of memory-compute device chiplets, according to an embodiment.

FIG. 11 illustrates an example tiling of memory-compute devices, according to an embodiment. In FIG. 11, a tiled chiplet example 1100 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 1100 includes, as one or multiple of its compute-near-memory (CNM) clusters, instances of the first CNM package 1000 from the example of FIG. 10. For example, the tiled chiplet example 1100 can include a first CNM cluster 1102 that includes a first chiplet 1110 (e.g., corresponding to the first chiplet 1002), a second chiplet 1112 (e.g., corresponding to the second chiplet 1004), a third chiplet 1114 (e.g., corresponding to the third chiplet 1006), and a fourth chiplet 1116 (e.g., corresponding to the fourth chiplet 1008). The chiplets in the first CNM cluster 1102 can be coupled to a common NOC hub, which in turn can be coupled to a NOC hub in an adjacent cluster or clusters (e.g., in a second CNM cluster 1104 or a fourth CNM cluster 1108).

In the example of FIG. 11, the tiled chiplet example 1100 includes the first CNM cluster 1102, the second CNM cluster 1104, a third CNM cluster 1106, and the fourth CNM cluster 1108. The various different CNM chiplets can be configured in a common address space such that the chiplets can allocate and share resources across the different tiles. In an example, the chiplets in the cluster can communicate with each other. For example, the first CNM cluster 1102 can be communicatively coupled to the second CNM cluster 1104 via an inter-chiplet CPI interface 1118, and the first CNM cluster 1102 can be communicatively coupled to the fourth CNM cluster 1108 via another or the same CPI interface. The second CNM cluster 1104 can be communicatively coupled to the third CNM cluster 1106 via the same or other CPI interface, and so on.

In an example, one of the compute-near-memory chiplets in the tiled chiplet example 1100 can include a host interface (e.g., corresponding to the host interface 1024 from the example of FIG. 10) that is responsible for workload balancing across the tiled chiplet example 1100. The host interface can facilitate access to host-based command request queues and response queues, such as from outside of the tiled chiplet example 1100. The host interface can dispatch new threads of execution using hybrid threading processors and the hybrid threading fabric in one or more of the compute-near-memory chiplets in the tiled chiplet example 1100.

Figure 12:
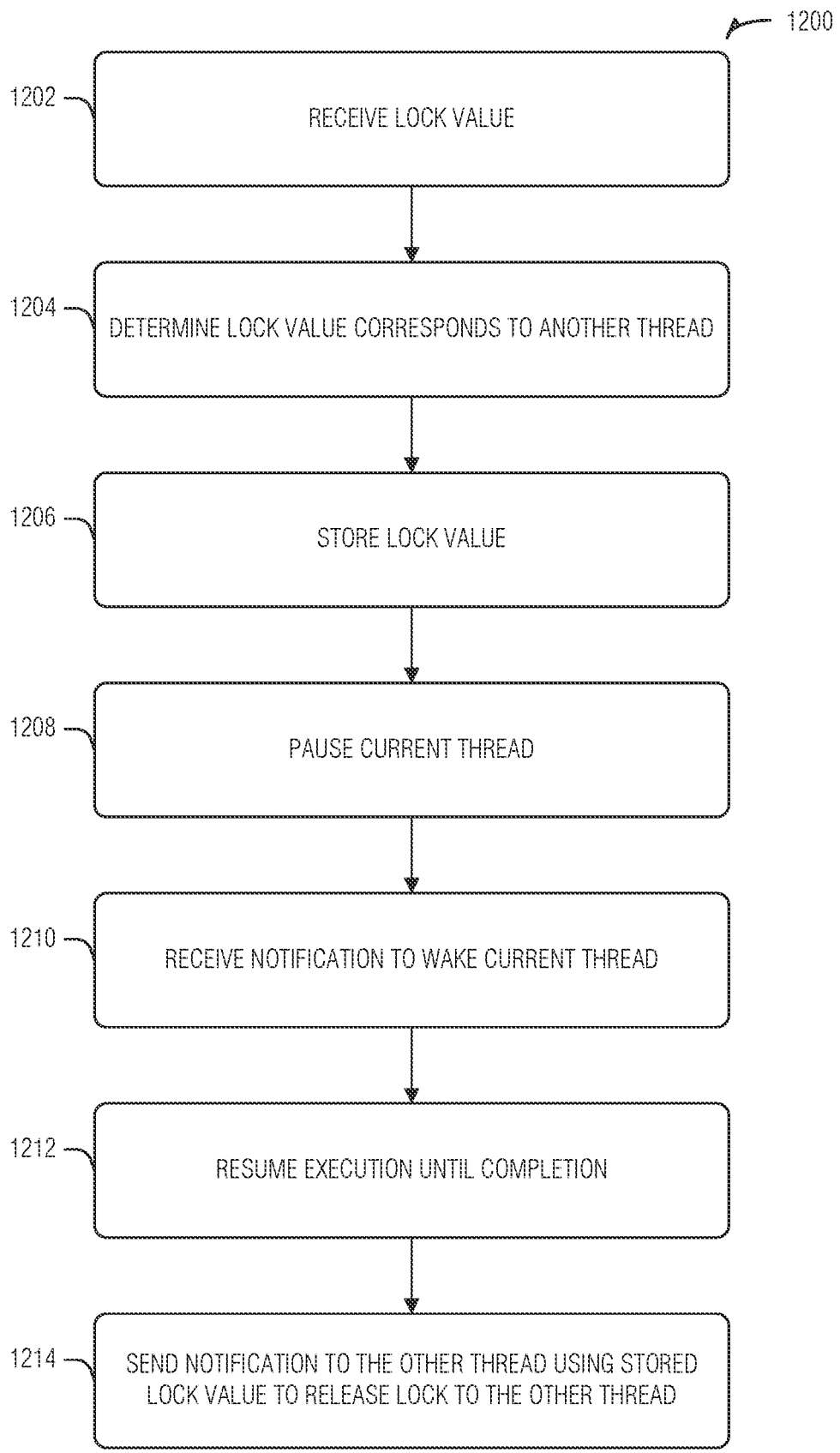
FIG. 12 is a flow chart of an example of a method for CHAINED RESOURCE LOCKING, according to an embodiment.

FIG. 12 is a flow chart of an example of a method 1200 for CHAINED RESOURCE LOCKING, according to an embodiment. Operations of the method 1200 are performed by computer hardware, such as that described with respect to FIGS. 1-5, 9A-11 and 13, such as the memory-compute device 112, the memory controller 200, the PAU 208 or PAU 302, the HTP 400, or the HTF 500, or components therein in various combinations. Computer hardware performing the operations of the method 1200 includes processing circuitry configured (e.g., hardwired, by software including firmware, or a combination of the two) to implement the operations.

At operation 1202, a thread executing in the processing circuitry obtains a value for a lock of a resource. Here, the lock is embodied in a storage component that can hold data (e.g., a register, solid-state memory, etc.) that is the value. In an example, the lock value is one of unlocked, locked, or a thread identifier. In an example, the lock value is a sixty-four bit value. In an example, the lock value of a logical zero corresponds to unlocked, a lock value of a logical one corresponds to locked, and all other values correspond to thread identifiers. In an example, only a lock value of unlocked (e.g., zero) indicates that the lock is free to obtain. All other values in this example indicate that the lock is being held by another thread.

At operation 1204, a determination is made that the value corresponds to a thread identifier. The presence of the thread identifier indicates that the resource is locked.

At operation 1206, the thread identifier is stored by the thread. Being stored by the thread can include keeping the thread identifier in thread state (e.g., managed by hardware upon which the thread is executing), in memory, or in another location.

At operation 1208, the thread is paused based on the value indicating that the resource is locked. In an example, the value of the lock is changed a second thread identifier of the thread prior to pausing the thread. That is, the current thread replaces the thread identifier in the lock value with its own thread identifier.

At operation 1210, the thread is awakened upon receipt of a first wake message corresponding to the resource. The wake message is an event in accordance with the hardware executing the thread. Here, the wake message is specific to the thread as well as the resource to which the lock applies.

At operation 1212, the thread continues execution based on the first wake message. Because the thread was paused when the resource was unavailable, the wake message indicates that the thread can continue including using the resource because the first wake message. Thus, at this stage, the thread has acquired the lock for the resource.

At operation 1214, the thread releases the lock by sending a second wake message that includes the thread identifier, previously stored by the thread, to awake another thread to use the resource. Here, the chained LIFO is moved down the chain by notifying the next thread to continue with the resource.

In an example, the method 1200 may include additional operations, such as obtaining the value of the lock by a second thread. In an example, the lock value is obtained in a return value of an atomic operation to acquire the lock on the memory controller. Here, the atomic operation can set the lock by changing the value to locked.

After the value of the lock is obtained by the second thread, the second thread can determine whether the value is unlocked or locked, perform an action based on the value, and release the lock. In an example, to release the lock, an atomic operation is performed to release the lock. Here, the atomic operation is implemented on a memory controller and the atomic operation operates to change the value of the lock. In this scenario, the memory controller manages memory that holds the lock value.

In an example, releasing the lock includes obtaining a current value of the lock. In an example, the additional operations of determining that the current value of the lock is locked, and changing the value of the lock to unlocked are performed, for example, as part of releasing the lock.

In an example, a determination can be made that the current value of the lock is a second thread identifier. Here, a third wake message that includes the second thread identifier can be sent to awake another thread to use the resource. In an example, the value of the lock is changed to locked to indicate the passing of the lock from one chain to another.

In an example, the value of the lock is unlocked when it is obtained by the second thread. Here, the action performed by the second thread can include setting the lock by changing the value of the lock to locked and continuing execution of the second thread including using the resource based on the value of the lock being unlocked.

In an example, when the value of the lock is locked, the action of the second thread can include pausing the second thread based on the value of the lock indicating that the resource is locked. Upon receipt of a third wake message directed to the second thread for the resource, the second thread can be awakened and continue execution, including use of the resource.

Figure 13:
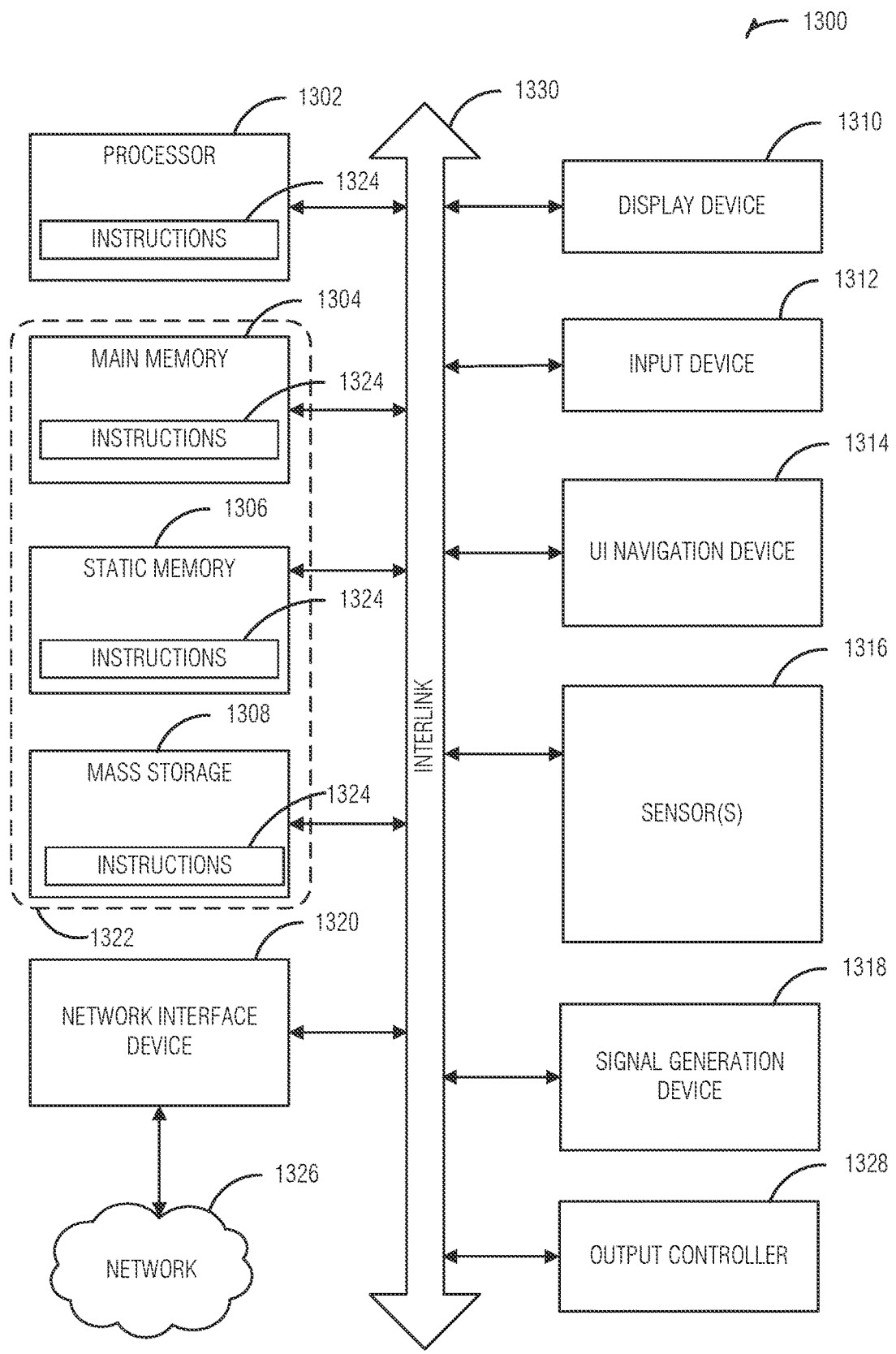
FIG. 13 illustrates a block diagram of an example machine with which, in which, or by which any one or more of the techniques (e.g., methodologies) discussed herein can be implemented.

FIG. 13 illustrates a block diagram of an example machine 1300 with which, in which, or by which any one or more of the techniques (e.g., methodologies) discussed herein can be implemented. Examples, as described herein, can include, or can operate by, logic or a number of components, or mechanisms in the machine 1300. Circuitry (e.g., processing circuitry) is a collection of circuits implemented in tangible entities of the machine 1300 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1300.

In alternative embodiments, the machine 1300 can operate as a standalone device or can be connected (e.g., networked) to other machines. In a networked deployment, the machine 1300 can operate in the capacity of a server machine, a client machine, or both in server-client network environments. In an example, the machine 1300 can act as a peer machine in peer-to-peer (P2P) (or other distributed) network environment. The machine 1300 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

The machine 1300 (e.g., computer system) can include a hardware processor 1302 (e.g., a central processing unit (CPU), a graphics processing unit (GPU), a hardware processor core, or any combination thereof), a main memory 1304, a static memory 1306 (e.g., memory or storage for firmware, microcode, a basic-input-output (BIOS), unified extensible firmware interface (UEFI), etc.), and mass storage device 1308 (e.g., hard drives, tape drives, flash storage, or other block devices) some or all of which can communicate with each other via an interlink 1330 (e.g., bus). The machine 1300 can further include a display device 1310, an alphanumeric input device 1312 (e.g., a keyboard), and a user interface (UI) Navigation device 1314 (e.g., a mouse). In an example, the display device 1310, the input device 1312, and the UI navigation device 1314 can be a touch screen display. The machine 1300 can additionally include a mass storage device 1308 (e.g., a drive unit), a signal generation device 1318 (e.g., a speaker), a network interface device 1320, and one or more sensor(s) 1316, such as a global positioning system (GPS) sensor, compass, accelerometer, or other sensor. The machine 1300 can include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1302, the main memory 1304, the static memory 1306, or the mass storage device 1308 can be, or include, a machine-readable media 1322 on which is stored one or more sets of data structures or instructions 1324 (e.g., software) embodying or used by any one or more of the techniques or functions described herein. The instructions 1324 can also reside, completely or at least partially, within any of registers of the hardware processor 1302, the main memory 1304, the static memory 1306, or the mass storage device 1308 during execution thereof by the machine 1300. In an example, one or any combination of the hardware processor 1302, the main memory 1304, the static memory 1306, or the mass storage device 1308 can constitute the machine-readable media 1322. While the machine-readable media 1322 is illustrated as a single medium, the term "machine-readable medium" can include a single medium or multiple media (e.g., a centralized or distributed database, or associated caches and servers) configured to store the one or more instructions 1324.

The term "machine readable medium" can include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1322 can be representative of the instructions 1324, such as instructions 1324 themselves or a format from which the instructions 1324 can be derived. This format from which the instructions 1324 can be derived can include source code, encoded instructions (e.g., in compressed or encrypted form), packaged instructions (e.g., split into multiple packages), or the like. The information representative of the instructions 1324 in the machine-readable media 1322 can be processed by processing circuitry into the instructions to implement any of the operations discussed herein. For example, deriving the instructions 1324 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1324.

In an example, the derivation of the instructions 1324 can include assembly, compilation, or interpretation of the information (e.g., by the processing circuitry) to create the instructions 1324 from some intermediate or preprocessed format provided by the machine-readable media 1322. The information, when provided in multiple parts, can be combined, unpacked, and modified to create the instructions 1324. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1324 can be further transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 can include one or more physical jacks (e.g., Ethernet, coaxial, or phone jacks) or one or more antennas to connect to the network 1326. In an example, the network interface device 1320 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is a system comprising: a memory controller configured to maintain a datastore representing a lock of a resource; and a hybrid threading processor (HTP) configured to execute a first thread to: obtain a value from the datastore; pause based on the value corresponding to a thread identifier indicating that the resource is locked, the thread identifier corresponding to a second thread; execute using the resource based on a first wake message corresponding to the resource; and release the lock by sending a second wake message to the second thread based on the thread identifier to awake the second thread to use the resource.

In Example 2, the subject matter of Example 1, wherein the HTP is configured to execute the thread to replace the value in the datastore with a second thread identifier of the first thread prior to pausing the first thread.

In Example 3, the subject matter of any of Examples 1-2, wherein contents of the datastore correspond to one of unlocked, locked, or a thread identifier, wherein contents that correspond to locked and the thread identifier indicate that the resource is locked.

In Example 4, the subject matter of Example 3, wherein the datastore is a sixty-four bits.

In Example 5, the subject matter of Example 4, wherein contents of the datastore equivalent to a logical zero correspond to unlocked, the contents of the datastore equivalent to a logical one correspond to locked, and all other contents of the datastore correspond to thread identifiers.

In Example 6, the subject matter of any of Examples 3-5, wherein the HTP is configured to execute a third thread to: obtain a second value from the datastore; determine that the second value is unlocked or locked; perform an action based on the second value; and release the lock.

In Example 7, the subject matter of Example 6, wherein the second value is unlocked, and wherein the action includes the HTP configured to execute the third thread to: set the lock by changing contents of the datastore to locked; and continue execution including using the resource based on the second value being unlocked.

In Example 8, the subject matter of any of Examples 6-7, wherein the second value is locked, and wherein the action includes the HTP configured to execute the third thread to: pause based on the second value indicating that the resource is locked; awaken upon receipt of a third wake message corresponding to the resource; and continue execution including using the resource based on the third wake message.

In Example 9, the subject matter of any of Examples 6-8, wherein, to release the lock, the HTP is configured to execute the third thread to obtain a current value of the datastore.

In Example 10, the subject matter of Example 9, wherein the HTP configured to execute the third thread to: determine that the current value is locked; and change contents of the datastore to unlocked.

In Example 11, the subject matter of any of Examples 9-10, wherein the HTP configured to execute the third thread to: determine that the current value is a second thread identifier; and send a third wake message that includes the second thread identifier to awake another thread to use the resource.

In Example 12, the subject matter of Example 11, the HTP configured to execute the third thread to change contents of the datastore to locked.

In Example 13, the subject matter of any of Examples 6-12, wherein, to release the lock, the HTP configured to execute the third thread to perform an atomic operation at the memory controller to release the lock on the memory controller to change contents of the datastore.

In Example 14, the subject matter of Example 13, wherein the value is obtained in a return value of an atomic operation to acquire the lock on the memory controller, and wherein the atomic operation sets the lock by changing the contents of the datastore to locked.

Example 15 is an apparatus comprising: a network interface; and processing circuitry, in a hybrid thread processor (HTP), configured to execute a first thread to: obtain, using the network interface, a value from a datastore representing a lock of a resource; pause based on the value corresponding to a thread identifier indicating that the resource is locked, the thread identifier corresponding to a second thread; execute using the resource based on a first wake message corresponding to the resource; and release the lock by sending a second wake message, through the network interface, to the second thread based on the thread identifier to awake the second thread to use the resource.

In Example 16, the subject matter of Example 15, wherein the processing circuitry is configured to execute the thread to replace the value in the datastore with a second thread identifier of the first thread prior to pausing the first thread.

In Example 17, the subject matter of any of Examples 15-16, wherein contents of the datastore correspond to one of unlocked, locked, or a thread identifier, wherein contents that correspond to locked and the thread identifier indicate that the resource is locked.

In Example 18, the subject matter of Example 17, wherein the datastore is a sixty-four bits.

In Example 19, the subject matter of Example 18, wherein contents of the datastore equivalent to a logical zero correspond to unlocked, the contents of the datastore equivalent to a logical one correspond to locked, and all other contents of the datastore correspond to thread identifiers.

In Example 20, the subject matter of any of Examples 17-19, wherein the processing circuitry is configured to execute a third thread to: obtain a second value from the datastore; determine that the second value is unlocked or locked; perform an action based on the second value; and release the lock.

In Example 21, the subject matter of Example 20, wherein the second value is unlocked, and wherein the action includes the HTP configured to execute the third thread to: set the lock by changing contents of the datastore to locked; and continue execution including using the resource based on the second value being unlocked.

In Example 22, the subject matter of any of Examples 20-21, wherein the second value is locked, and wherein the action includes the HTP configured to execute the third thread to: pause based on the second value indicating that the resource is locked; awaken upon receipt of a third wake message corresponding to the resource; and continue execution including using the resource based on the third wake message.

In Example 23, the subject matter of any of Examples 20-22, wherein, to release the lock, the processing circuitry is configured to execute the third thread to obtain a current value of the datastore.

In Example 24, the subject matter of Example 23, wherein the processing circuitry configured to execute the third thread to: determine that the current value is locked; and change contents of the datastore to unlocked.

In Example 25, the subject matter of any of Examples 23-24, wherein the processing circuitry configured to execute the third thread to: determine that the current value is a second thread identifier; and send a third wake message that includes the second thread identifier to awake another thread to use the resource.

In Example 26, the subject matter of Example 25, the processing circuitry configured to execute the third thread to change contents of the datastore to locked.

In Example 27, the subject matter of any of Examples 20-26, wherein, to release the lock, the processing circuitry configured to execute the third thread to perform an atomic operation at a memory controller managing the datastore to release the lock by changing contents of the datastore.

In Example 28, the subject matter of Example 27, wherein the value is obtained in a return value of an atomic operation to acquire the lock on the memory controller, and wherein the atomic operation sets the lock by changing the contents of the datastore to locked.

Example 29 is a method comprising: obtaining, by a first thread executing in processing circuitry, a value from a datastore representing a lock of a resource; pausing the first thread based on the value corresponding to a thread identifier indicating that the resource is locked, the thread identifier corresponding to a second thread; executing the first thread using the resource based on a first wake message corresponding to the resource; and releasing the lock by sending a second wake message, from the first thread, to the second thread based on the thread identifier to awake the second thread to use the resource.

In Example 30, the subject matter of Example 29, comprising replacing the value in the datastore with a second thread identifier of the first thread prior to pausing the first thread.

In Example 31, the subject matter of any of Examples 29-30, wherein contents of the datastore correspond to one of unlocked, locked, or a thread identifier, wherein contents that correspond to locked and the thread identifier indicate that the resource is locked.

In Example 32, the subject matter of Example 31, wherein the datastore is a sixty-four bits.

In Example 33, the subject matter of Example 32, wherein contents of the datastore equivalent to a logical zero correspond to unlocked, the contents of the datastore equivalent to a logical one correspond to locked, and all other contents of the datastore correspond to thread identifiers.

In Example 34, the subject matter of any of Examples 31-33, comprising: obtaining a second value from the datastore by a third thread; determining that the second value is unlocked or locked; performing an action based on the second value; and releasing the lock.

In Example 35, the subject matter of Example 34, wherein the second value is unlocked, and wherein the action includes: setting the lock by changing contents of the datastore to locked; and continuing execution of the third thread including using the resource based on the second value being unlocked.

In Example 36, the subject matter of any of Examples 34-35, wherein the second value is locked, and wherein the action includes: pausing the third thread based on the second value indicating that the resource is locked; awakening the third thread upon receipt of a third wake message corresponding to the resource; and continuing execution of the third thread including using the resource based on the third wake message.

In Example 37, the subject matter of any of Examples 34-36, wherein releasing the lock includes obtaining a current value of the datastore.

In Example 38, the subject matter of Example 37, comprising: determining that the current value is locked; and changing contents of the datastore to unlocked.

In Example 39, the subject matter of any of Examples 37-38, comprising: determining that the current value is a second thread identifier; and sending a third wake message that includes the second thread identifier to awake another thread to use the resource.

In Example 40, the subject matter of Example 39, comprising changing contents of the datastore to locked.

In Example 41, the subject matter of any of Examples 34-40, wherein releasing the lock includes performing an atomic operation to release the lock on a memory controller to change contents of the datastore, wherein the datastore is memory, and wherein the memory controller manages the memory of the datastore.

In Example 42, the subject matter of Example 41, wherein the value is obtained in a return value of an atomic operation to acquire the lock on the memory controller, and wherein the atomic operation sets the lock by changing the contents of the datastore to locked.

Example 43 is machine readable media including instructions that, when executed by processing circuitry, cause the processing circuitry to perform operations comprising: obtaining, by a first thread executing in processing circuitry, a value from a datastore representing a lock of a resource; pausing the first thread based on the value corresponding to a thread identifier indicating that the resource is locked, the thread identifier corresponding to a second thread; executing the first thread using the resource based on a first wake message corresponding to the resource; and releasing the lock by sending a second wake message, from the first thread, to the second thread based on the thread identifier to awake the second thread to use the resource.

In Example 44, the subject matter of Example 43, wherein the operations further comprise replacing the value in the datastore with a second thread identifier of the first thread prior to pausing the first thread.

In Example 45, the subject matter of any of Examples 43-44, wherein contents of the datastore correspond to one of unlocked, locked, or a thread identifier, wherein contents that correspond to locked and the thread identifier indicate that the resource is locked.

In Example 46, the subject matter of Example 45, wherein the datastore is a sixty-four bits.

In Example 47, the subject matter of Example 46, wherein contents of the datastore equivalent to a logical zero correspond to unlocked, the contents of the datastore equivalent to a logical one correspond to locked, and all other contents of the datastore correspond to thread identifiers.

In Example 48, the subject matter of any of Examples 45-47, wherein the operations further comprise: obtaining a second value from the datastore by a third thread; determining that the second value is unlocked or locked; performing an action based on the second value; and releasing the lock.

In Example 49, the subject matter of Example 48, wherein the second value is unlocked, and wherein the action includes: setting the lock by changing contents of the datastore to locked; and continuing execution of the third thread including using the resource based on the second value being unlocked.

In Example 50, the subject matter of any of Examples 48-49, wherein the second value is locked, and wherein the action includes: pausing the third thread based on the second value indicating that the resource is locked; awakening the third thread upon receipt of a third wake message corresponding to the resource; and continuing execution of the third thread including using the resource based on the third wake message.

In Example 51, the subject matter of any of Examples 48-50, wherein releasing the lock includes obtaining a current value of the datastore.

In Example 52, the subject matter of Example 51, wherein the operations further comprise: determining that the current value is locked; and changing contents of the datastore to unlocked.

In Example 53, the subject matter of any of Examples 51-52, wherein the operations further comprise: determining that the current value is a second thread identifier; and sending a third wake message that includes the second thread identifier to awake another thread to use the resource.

In Example 54, the subject matter of Example 53, wherein the operations further comprise changing contents of the datastore to locked.

In Example 55, the subject matter of any of Examples 48-54, wherein releasing the lock includes performing an atomic operation to release the lock on a memory controller to change contents of the datastore, wherein the datastore is memory, and wherein the memory controller manages the memory of the datastore.

In Example 56, the subject matter of Example 55, wherein the value is obtained in a return value of an atomic operation to acquire the lock on the memory controller, and wherein the atomic operation sets the lock by changing the contents of the datastore to locked.

Example 57 is a system comprising: means for obtaining, by a first thread executing in processing circuitry, a value from a datastore representing a lock of a resource; means for pausing the first thread based on the value corresponding to a thread identifier indicating that the resource is locked, the thread identifier corresponding to a second thread; means for executing the first thread using the resource based on a first wake message corresponding to the resource; and means for releasing the lock by sending a second wake message, from the first thread, to the second thread based on the thread identifier to awake the second thread to use the resource.

In Example 58, the subject matter of Example 57, comprising means for replacing the value in the datastore with a second thread identifier of the first thread prior to pausing the first thread.

In Example 59, the subject matter of any of Examples 57-58, wherein contents of the datastore correspond to one of unlocked, locked, or a thread identifier, wherein contents that correspond to locked and the thread identifier indicate that the resource is locked.

In Example 60, the subject matter of Example 59, wherein the datastore is a sixty-four bits.

In Example 61, the subject matter of Example 60, wherein contents of the datastore equivalent to a logical zero correspond to unlocked, the contents of the datastore equivalent to a logical one correspond to locked, and all other contents of the datastore correspond to thread identifiers.

In Example 62, the subject matter of any of Examples 59-61, comprising: means for obtaining a second value from the datastore by a third thread; means for determining that the second value is unlocked or locked; means for performing an action based on the second value; and means for releasing the lock.

In Example 63, the subject matter of Example 62, wherein the second value is unlocked, and wherein the means for performing the action include: means for setting the lock by changing contents of the datastore to locked; and means for continuing execution of the third thread including using the resource based on the second value being unlocked.

In Example 64, the subject matter of any of Examples 62-63, wherein the second value is locked, and wherein the means for perform the action include: means for pausing the third thread based on the second value indicating that the resource is locked; means for awakening the third thread upon receipt of a third wake message corresponding to the resource; and means for continuing execution of the third thread including using the resource based on the third wake message.

In Example 65, the subject matter of any of Examples 62-64, wherein the means for releasing the lock include means for obtaining a current value of the datastore.

In Example 66, the subject matter of Example 65, comprising: means for determining that the current value is locked; and means for changing contents of the datastore to unlocked.

In Example 67, the subject matter of any of Examples 65-66, comprising: means for determining that the current value is a second thread identifier; and means for sending a third wake message that includes the second thread identifier to awake another thread to use the resource.

In Example 68, the subject matter of Example 67, comprising means for changing contents of the datastore to locked.

In Example 69, the subject matter of any of Examples 62-68, wherein the means for releasing the lock include means for performing an atomic operation to release the lock on a memory controller to change contents of the datastore, wherein the datastore is memory, and wherein the memory controller manages the memory of the datastore.

In Example 70, the subject matter of Example 69, wherein the value is obtained in a return value of an atomic operation to acquire the lock on the memory controller, and wherein the atomic operation sets the lock by changing the contents of the datastore to locked.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
    a memory controller configured to maintain a datastore representing a lock of a resource; and
    a hybrid threading processor (HTP) configured to execute a first thread to:
        obtain a lock value from the datastore;
        responsive to the lock value corresponding to a thread identifier of a second thread and indicating that the resource is locked:
            store the thread identifier of the second thread obtained from the lock value in the first thread;
            write a second thread identifier corresponding to the first thread into the lock value in the datastore to replace the thread identifier for the second thread in the lock value; and
            sleep the first thread, the thread identifier being a unique destination value for the second thread, threads of the HTP each having a different thread identifier from each other;
        continue execution using the resource based on a first wake message corresponding to the resource, wherein the first wake message originated from a third thread and granted the first thread the lock without interacting with the lock value in the datastore; and
        release the lock by sending a second wake message to the second thread based on the thread identifier stored in the first thread to awake the second thread to use the resource, the first thread being a link in a last-in-first-out (LIFO) chain that includes the second thread and the third thread, and wherein any thread that writes a thread identifier to the lock value does not have the lock when the thread identifier is written to the lock value.

2. The system of claim 1, wherein contents of the datastore correspond to one of unlocked, locked, or a thread identifier, wherein contents that correspond to locked and the thread identifier indicate that the resource is locked.

3. The system of claim 2, wherein the datastore is sixty-four bits.

4. The system of claim 3, wherein contents of the datastore equivalent to a logical zero correspond to unlocked, the contents of the datastore equivalent to a logical one correspond to locked, and all other contents of the datastore correspond to thread identifiers.

5. The system of claim 2, wherein the HTP is configured to execute a fourth thread to:
    obtain a second value from the datastore;
    determine that the second value is unlocked or locked;
    perform an action based on the second value; and
    release the lock.

6. The system of claim 5, wherein the second value is unlocked, and wherein the action includes the HTP configured to execute the fourth thread to:
    set the lock by changing contents of the datastore to locked; and
    continue execution including using the resource based on the second value being unlocked.

7. The system of claim 5, wherein the second value is locked, and wherein the action includes the HTP configured to execute the fourth thread to:
    sleep based on the second value indicating that the resource is locked;
    awaken upon receipt of a third wake message corresponding to the resource; and
    continue execution including using the resource based on the third wake message.

8. The system of claim 5, wherein, to release the lock, the HTP is configured to execute the fourth thread to obtain a current value of the datastore.

9. The system of claim 8, wherein the HTP configured to execute the fourth thread to:
    determine that the current value is locked; and
    change contents of the datastore to unlocked.

10. The system of claim 8, wherein the HTP configured to execute the fourth thread to:
    determine that the current value is a second thread identifier; and
    send a third wake message that includes the second thread identifier to awake another thread to use the resource.

11. The system of claim 10, the HTP configured to execute the fourth thread to change contents of the datastore to locked.

12. The system of claim 5, wherein, to release the lock, the HTP configured to execute the fourth thread to perform an atomic operation at the memory controller to release the lock on the memory controller to change contents of the datastore.

13. The system of claim 12, wherein the lock value is obtained in a return value of an atomic operation to acquire the lock on the memory controller, and wherein the atomic operation sets the lock by changing the contents of the datastore to locked.

14. An apparatus comprising:
    a network interface; and
    processing circuitry, in a hybrid thread processor (HTP), configured to execute a first thread to:

obtain, using the network interface, a lock value from a datastore representing a lock of a resource;
responsive to the lock value corresponding to a thread identifier of a second thread and indicating that the resource is locked:
store the thread identifier of the second thread obtained from the lock value in the first thread;
write a second thread identifier corresponding to the first thread into the lock value in the datastore to replace the thread identifier for the second thread in the lock value; and
sleep the first thread, the thread identifier being a unique destination value for the second thread, threads of the HTP each having a different thread identifier from each other;
continue execution using the resource based on a first wake message corresponding to the resource, wherein the first wake message originated from a third thread and granted the first thread the lock without interacting with the lock value in the datastore; and
release the lock by sending a second wake message, through the network interface, to the second thread based on the thread identifier stored in the first thread to awake the second thread to use the resource, the first thread being a link in a last-in-first-out (LIFO) chain that includes the second thread and the third thread, and wherein any thread that writes a thread identifier to the lock value does not have the lock when the thread identifier is written to the lock value.

15. The apparatus of claim 14, wherein contents of the datastore correspond to one of unlocked, locked, or a thread identifier, wherein contents that correspond to locked and the thread identifier indicate that the resource is locked.

16. The apparatus of claim 15, wherein the processing circuitry is configured to execute a fourth thread to:
obtain a second value from the datastore;
determine that the second value is unlocked or locked;
perform an action based on the second value; and
release the lock.

17. The apparatus of claim 16, wherein the second value is unlocked, and wherein the action includes the HTP configured to execute the fourth thread to:
set the lock by changing contents of the datastore to locked; and
continue execution including using the resource based on the second value being unlocked.

18. The apparatus of claim 16, wherein the second value is locked, and wherein the action includes the HTP configured to execute the fourth thread to:
sleep based on the second value indicating that the resource is locked;
awaken upon receipt of a third wake message corresponding to the resource; and
continue execution including using the resource based on the third wake message.

19. The apparatus of claim 16, wherein, to release the lock, the processing circuitry is configured to execute the fourth thread to obtain a current value of the datastore.

20. The apparatus of claim 19, wherein the processing circuitry configured to execute the fourth thread to:
determine that the current value is locked; and
change contents of the datastore to unlocked.

21. The apparatus of claim 19, wherein the processing circuitry configured to execute the fourth thread to:
determine that the current value is a second thread identifier; and
send a third wake message that includes the second thread identifier to awake another thread to use the resource.

22. The apparatus of claim 21, the processing circuitry configured to execute the fourth thread to change contents of the datastore to locked.

23. The apparatus of claim 16, wherein, to release the lock, the processing circuitry configured to execute the fourth thread to perform an atomic operation at a memory controller managing the datastore to release the lock by changing contents of the datastore.

24. The apparatus of claim 23, wherein the lock value is obtained in a return value of an atomic operation to acquire the lock on the memory controller, and wherein the atomic operation sets the lock by changing the contents of the datastore to locked.

25. Non-transitory machine readable media including instructions that, when executed by processing circuitry, cause the processing circuitry to perform operations comprising:
obtaining, by a first thread executing in processing circuitry, a lock value from a datastore representing a lock of a resource;
responsive to the lock value corresponding to a thread identifier of a second thread and indicating that the resource is locked:
storing the thread identifier of the second thread obtained from the lock value in the first thread;
writing a second thread identifier corresponding to the first thread into the lock value in the datastore to replace the thread identifier for the second thread in the lock value; and
sleeping the first thread, the thread identifier being a unique destination value for the second thread, threads of the processing circuitry each having a different thread identifier from each other;
continuing execution of the first thread using the resource based on a first wake message corresponding to the resource, wherein the first wake message originated from a third thread and granted the first thread the lock without interacting with the lock value in the datastore; and
releasing the lock by sending a second wake message, from the first thread, to the second thread based on the thread identifier stored in the first thread to awake the second thread to use the resource, the first thread being a link in a last-in-first-out (LIFO) chain that includes the second thread and the third thread, and wherein any thread that writes a thread identifier to the lock value does not have the lock when the thread identifier is written to the lock value.

26. The non-transitory machine readable media of claim 25, wherein contents of the datastore correspond to one of unlocked, locked, or a thread identifier, wherein contents that correspond to locked and the thread identifier indicate that the resource is locked.

27. The non-transitory machine readable media of claim 26, wherein the operations further comprise:
obtaining a second value from the datastore by a fourth thread;
determining that the second value is unlocked or locked;
performing an action based on the second value; and
releasing the lock.

28. The non-transitory machine readable media of claim 27, wherein the second value is unlocked, and wherein the action includes:
setting the lock by changing contents of the datastore to locked; and continuing execution of the fourth thread including using the resource based on the second value being unlocked.

29. The non-transitory machine readable media of claim 27, wherein releasing the lock includes performing an atomic operation to release the lock on a memory controller to change contents of the datastore, wherein the datastore is memory, and wherein the memory controller manages the memory of the datastore.

* * * * *